United States Patent
Camenisch et al.

(10) Patent No.: US 12,519,621 B2
(45) Date of Patent: Jan. 6, 2026

(54) REDISTRIBUTION OF SECRET SHARINGS

(71) Applicant: DFINITY STIFTUNG, Zürich (CH)

(72) Inventors: Jan Camenisch, Thalwil (CH); Andrea Cerulli, Zürich (CH); Manu Drijvers, Zürich (CH); Jens Groth, Zürich (CH)

(73) Assignee: DFINITY STIFTUNG, Zürich (CH)

( * ) Notice: Subject to any disclaimer, the term of this patent is extended or adjusted under 35 U.S.C. 154(b) by 231 days.

(21) Appl. No.: 18/029,030

(22) PCT Filed: Sep. 30, 2020

(86) PCT No.: PCT/EP2020/077414
§ 371 (c)(1),
(2) Date: Mar. 28, 2023

(87) PCT Pub. No.: WO2022/069035
PCT Pub. Date: Apr. 7, 2022

(65) Prior Publication Data
US 2023/0361993 A1    Nov. 9, 2023

(51) Int. Cl.
*H04L 9/08*    (2006.01)
*H04L 9/06*    (2006.01)
*H04L 9/32*    (2006.01)

(52) U.S. Cl.
CPC ............ *H04L 9/085* (2013.01); *H04L 9/0618* (2013.01); *H04L 9/3218* (2013.01)

(58) Field of Classification Search
CPC ..... H04L 9/085; H04L 9/0618; H04L 9/3218; H04L 9/0825; H04L 9/0891;
(Continued)

(56) References Cited

U.S. PATENT DOCUMENTS 9,641,325 B1 *   5/2017   Camenisch ......... G06F 9/45558
10,795,766 B2 *  10/2020  Dhuse .................... H04L 63/06
(Continued)

FOREIGN PATENT DOCUMENTS

JP    2004341152 A    12/2004
WO    2019145790 A1    8/2019

OTHER PUBLICATIONS

Dai Ikarashi et al., "Short Secret Sharing Applicable to Multi-Party Computation against Cheating", The 30th Symposium on Cryptography and Information Security, Kyoto, Japan, Jan. 22-25, 2013, 9 pages. (Machine English translation included for first page).
(Continued)

*Primary Examiner* — Meng Li
(74) *Attorney, Agent, or Firm* — Mannava & Kang, P.C

(57) ABSTRACT

Method for redistribution of a (n,t)-secret sharing of a secrets from a set of dealers to a set of receivers. The method comprises performing by each of at least the threshold number t of dealers, —creating a (n',t')-secret sharing of its respective secret share, —creating a set of ciphertexts comprising for each receiver one encrypted sub-share of the n1 secret sub-shares of its respective secret share and being encrypted with respect to a public encryption key of the respective receiver. The public encryption key is a key of a public-key encryption scheme. —generating a non-interactive zero-knowledge proof that the set of ciphertexts jointly contain a redistribution of its secret share—broadcasting a dealing to the set of receivers, the dealing comprising the set of ciphertexts for the set of receivers and the corresponding non-interactive zero-knowledge proof.

17 Claims, 10 Drawing Sheets

(58) Field of Classification Search
CPC ....... H04L 9/3239; H04L 9/50; H04L 9/0861; H04L 9/30; H04L 9/3247; Y04S 40/20
See application file for complete search history.

(56) References Cited

U.S. PATENT DOCUMENTS

| | | | | |
|---|---|---|---|---|
| 11,082,215 | B2* | 8/2021 | Irazabal | G06F 21/64 |
| 11,184,169 | B1* | 11/2021 | Sokolov | H04L 9/0894 |
| 2006/0026423 | A1* | 2/2006 | Bangerter | H04L 9/3234 |
| | | | | 713/164 |
| 2010/0158254 | A1* | 6/2010 | Schaad | G06F 21/6209 |
| | | | | 380/282 |
| 2010/0185863 | A1* | 7/2010 | Rabin | H04L 9/085 |
| | | | | 380/278 |
| 2015/0341335 | A1* | 11/2015 | Camenisch | H04L 63/0876 |
| | | | | 713/156 |
| 2016/0094540 | A1* | 3/2016 | Camenisch | H04L 9/085 |
| | | | | 726/8 |
| 2017/0104588 | A1* | 4/2017 | Camenisch | H04L 9/0891 |
| 2018/0227278 | A1* | 8/2018 | Camenisch | H04L 9/0825 |
| 2020/0082399 | A1 | 3/2020 | Deshpande et al. | |

OTHER PUBLICATIONS

Machine English translation of "Notice of Reasons for Refusal for Japanese Application No. 2023-519886", dated Sep. 11, 2024, 7 pages.

Mariko Uchida et al., "Easy Key Management in Multiple Association by Using (2,2)-threshold Secret Sharing for A Group File Sharing System", The Institute of Electronics, Information and Communication Engineers, IEICE Technical Report, Mar. 2, 2009, vol. 108, No. 472, pp. 71-78.

Ogata et al., "Secret Sharing Scheme and its Application", Journal of the Institute of Electronics, Information and Communication Engineers, Japan, Institute of Electronics, Information and Communication Engineers, Dec. 25, 1999, 82nd volume, No. 12, and pp. 1228-1236. (Machine English translation included for first page).

Takuya Makino et al., "A Multiple Times Verifiable Secret Sharing Scheme", A code and the information security symposium proceedings [online], Japan, Jan. 21, 2020, 2C2-5, and pp. 1-5 (Machine English translation included for first page).

"International Search Report and Written Opinion for PCT Application No. PCT/EP2020/077414", mailed Jun. 22, 2021, 9 pages.

Fabrice Benhamouda, et al., "Can a Blockchain Keep a Secret?", Apr. 24, 2020, 35 pages.

Ran Canetti, et al., "A Forward-Secure Public-Key Encryption Scheme", Feb. 6, 2007, 30 pages.

Mihir Bellare, et al., "Multirecipient Encryption Schemes: How to Save on Bandwidth and Computation Without Sacrificing Security", Nov. 1, 2007, 17 pages.

Alfredo De Santis, et al., "Robust Non-interactive Zero Knowledge", 2001, 32 pages.

Jens Groth, et al., "Snarky Signatures: Minimal Signatures of Knowledge from Simulation-Extractable SNARKs", 2017, 36 pages.

* cited by examiner

| | 302 $pk_A$, secret s | 303 $pk_A$, secret s | 304 $pk_A$, secret s | 305 $pk_A$, secret s | 306 $pk_A$, secret s |
|---|---|---|---|---|---|
| 311 N1 $pk_{N1}$ | $s_{1,0}$ | $s_{1,1}$ $dk_{R1,1}$ | $s_{1,2}$ $dk_{R1,2}$ | $s_{1,3}$ $dk_{R1,3}$ | $s_{1,4}$ $dk_{R1,4}$ |
| 312 N2 $pk_{N2}$ | $s_{2,0}$ | $s_{2,1}$ $dk_{R2,1}$ | $s_{2,2}$ $dk_{R1,2}$ | $s_{2,3}$ $dk_{R2,3}$ | $s_{2,4}$ $dk_{R2,4}$ |
| 313 N3 $pk_{N3}$ | $s_{3,0}$ | $s_{3,1}$ $dk_{R3,1}$ | $s_{3,2}$ $dk_{R3,2}$ | $s_{3,3}$ $dk_{R3,3}$ | |
| 314 N4 $pk_{N4}$ | $s_{4,0}$ | $s_{4,1}$ $dk_{R4,1}$ | $s_{4,2}$ $dk_{R4,2}$ | $s_{4,3}$ $dk_{R4,3}$ | $s_{4,4}$ $dk_{R4,4}$ |
| 315 N5 $pk_{N5}$ | | | $s_{5,2}$ $dk_{R5,2}$ | $s_{5,3}$ $dk_{R5,3}$ | $s_{5,4}$ $dk_{R5,4}$ |
| 316 N6 $pk_{N6}$ | | | $s_{6,2}$ $dk_{R6,2}$ | $s_{6,3}$ $dk_{R6,3}$ | $s_{6,4}$ $dk_{R6,4}$ |
| 317 N7 $pk_{N7}$ | | | | | $s_{7,4}$ $dk_{R7,4}$ |

$t_0$ $e_0$ $t_1$ $e_1$ $t_2$ $e_2$ $t_3$ $e_3$ $t_4$ $e_4$ $t_5$ time

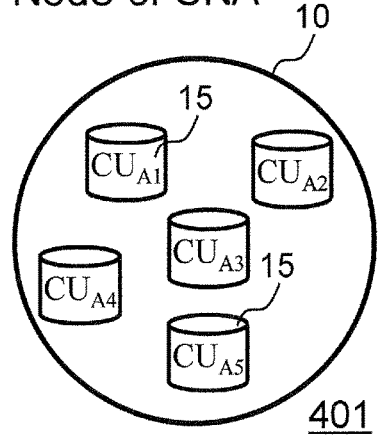
Node of SNA
401

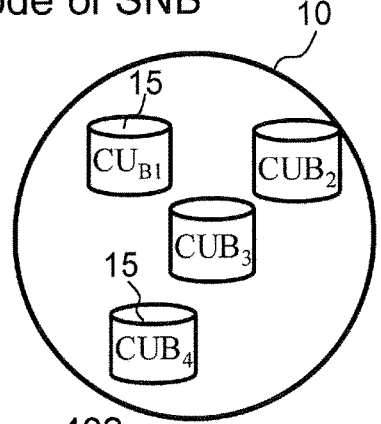
Node of SNB
402

FIG. 4

REDISTRIBUTION OF SECRET SHARINGS

CLAIM FOR PRIORITY

The present application is a national stage filing under 35 U.S.C 371 of PCT application number PCT/EP2020/077414, having an international filing date of Sep. 30, 2020, the disclosure of which is hereby incorporated by reference in its entirety.

TECHNICAL FIELD

The present invention pertains to a computer-implemented method for redistribution of a pre-existing secret sharing of a secret from a set of dealers to a set of receivers.

Further aspects relate to a distributed network, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may contain small programs known e.g. as smart contracts.

In order for a transaction to be written to the blockchain, it must be "validated" by the network. In other words, the network nodes have to gain consent on blocks to be written to the blockchain. Such consent may be achieved by various consensus protocols.

One type of consensus protocols are proof-of-work consensus protocols. A proof-of-work consensus protocol generally requires some work from the parties that participate in the consensus protocol, usually corresponding to processing time by a computer.

Proof-of-work-based cryptocurrency systems such as Bitcoin involve the solving of computationally intensive puzzles to validate transactions and to create new blocks.

Another type of consensus protocols are proof-of-stake-consensus protocols. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Apart from cryptocurrencies, distributed networks may be used for various other applications. In particular, they may be used for providing decentralized and distributed computing capabilities and services.

One problem of distributed networks is to provide efficient and secure methods for key management of the nodes of the network.

Distributed networks may use in particular public key cryptography for encrypting and decrypting messages and/or for issuing and verifying digital signatures.

In case of changing network configurations as well as for security reasons it is often desirable to reshare or in other words redistribute key material associated to the used encryption/decryption schemes, in particular secrets of key material.

DISCLOSURE OF THE INVENTION

One object of an aspect of the invention is to provide an advanced method for redistribution of a pre-existing secret sharing, in particular in terms of efficiency and/or security.

According to an embodiment of a first aspect of the invention, there is provided a computer-implemented method for redistribution of a $(n,t)$-secret sharing of a secret s from a set of dealers to a set of receivers. The $(n,t)$-secret sharing comprises n secret shares, wherein a threshold number $t \leq n$ of the secret shares are sufficient to reconstruct the secret s. The method comprises performing, by each of at least the threshold number t of dealers, the step of creating a $(n',t')$-secret sharing of its respective secret share, the $(n',t')$-secret sharing comprising n' secret sub-shares of its respective secret share, wherein a threshold number $t' \leq n'$ of the secret sub-shares is sufficient to reconstruct the secret share. The method further comprises performing, by each of at least the threshold number t of dealers, the step of creating a set of ciphertexts, the set of ciphertexts comprising for each receiver one encrypted sub-share of the n' secret sub-shares of its respective secret share, the encrypted secret sub-share being encrypted with respect to a public encryption key of the respective receiver. The public encryption key is a key of a public-key encryption scheme. The method comprises further performing, by each of at least the threshold number t of dealers, a step of generating a non-interactive zero-knowledge proof that the set of ciphertexts jointly contain a redistribution of its secret share and a step of broadcasting a dealing to the set of receivers, the dealing comprising the set of ciphertexts for the set of receivers and the corresponding non-interactive zero-knowledge proof.

Embodiments of the method allow to reshare or redistribute an existing secret sharing from a set of dealers to a set of receivers. Hence methods according to embodiments of the invention provide a method that redistributes a secret sharing from multiple dealers to multiple receivers.

According to such an embodied method a redistribution of a secret sharing may be performed in an efficient and secure way. More particularly, the broadcasting of the encrypted sub-shares and of the corresponding zero-knowledge proof facilitates an efficient communication between the set of dealers and the set of receivers. In particular, the redistribution may be performed in a non-interactive manner, i.e. each of the dealers only generates a single dealing and broadcasts this single dealing to the set of receivers which read the broadcasted dealings.

Apart from the broadcasting there is no further interaction needed between the set of dealers and the set of receivers. This includes that there is no bilateral communication needed between the dealers and the receivers and no complaint phase either.

In particular, there is no interaction needed between the receivers. The receivers can verify the broadcasted dealings independently from each other and do not have to interact with anybody.

The non-interactive characteristic of the embodied method, in particular the characteristic that the receivers do not have to interact with anybody, is in particular facilitated by providing separate non-interactive zero-knowledge proofs by each of the respective dealers for each of the single dealings. The non-interactive zero-knowledge proofs guarantee that each receiver can decrypt and get its correct share. Hence the set of receivers can verify the correctness of the secret sharings in an independent manner.

According to embodiments a non-interactive zero-knowledge proof shall be defined as a zero-knowledge proof which is configured such that the set of receivers do not have to interact with anybody, i.e. neither with the prover nor with any other receiver to verify the proof.

The zero-knowledge proof provides a proof that the set of ciphertexts jointly contain a redistribution of the secret share of the respective dealer. In other words, the zero-knowledge proof provides a proof that the set of ciphertexts produced by each dealer comprises a correct sharing of the secret share of the dealer, i.e. that the set of ciphertexts are valid encryptions of correct secret shares.

According to an embodiment the method further comprising checking, by a predefined set of parties, in particular by the set of receivers, the non-interactive zero-knowledge proofs of the dealings. Once a sufficient number t of proofs have been successfully checked or in other words verified, each of the receivers may decrypt its encrypted sub-shares across the dealings. In other words, each receiver may receive and decrypt one sub-share from each of the dealings broadcasted by the set of dealers. Then each of the receivers may combine the decrypted sub-shares to a new secret share of the secret.

According to another embodiment, each of the zero-knowledge proofs are configured in a non-interactive manner such that each of the dealers may create its zero-knowledge proof without interacting with any of the other dealers.

Hence according to such an embodiment a non-interactive zero-knowledge proof is a proof which is configured such that not only the receivers, but also the dealers do not have to interact with each other and they do not have to interact with the receivers, except by creating an output that is later broadcasted to the receivers.

This further increases the efficiency.

According to a further embodiment, the zero-knowledge proofs are publicly verifiable zero-knowledge proofs. A publicly verifiable zero-knowledge proof may be defined as a proof which can be verified by anybody, in particular by any interested party. Hence when a dealing is complete and is broadcasted, anybody can check with the proof that the dealing is correct and that all receivers are able to obtain correct shares from the dealing.

According to an embodiment, the secret sharing is a linear secret sharing, in particular a Shamir secret sharing.

According to an embodiment, the method comprises steps of creating, by each dealer, associated public key material associated to its secret share and its secret sharing of said secret share and adding the associated public key material to the dealing.

In general associated public key material may be defined as a material which is a function of the secret sharing.

The associated public key material may comprise according to embodiments public group elements which are related/associated to the secret sharing created by the respective dealer.

The associated public key material may comprise according to embodiments a public group element which is related/associated to the secret share of the respective dealer.

According to an embodiment the secret the dealers have a secret sharing of is a secret key corresponding to a public verification key of a public key signature scheme.

According to an embodiment the method further comprises creating, by any participant or party, in particular by a receiver, from the associated public key material created by the set of dealers new associated public key material associated to the receivers' new secret sharing and the receivers' new secret shares.

According to embodiments the new associated public key material may be computed by a Lagrange interpolation.

According to an embodiment the creating of the new associated public key material comprises deriving the new associated public key material from the associated public key material created by the set of dealers.

According to embodiments the new associated public key material may comprise public share verification keys which are associated to the new secret shares of the receivers.

According to embodiments the new associated public key material may comprise a public verification key related to the secret key.

According to embodiments the new associated public key material may comprise elements from which the public share verification keys of the receivers and/or the public verification key may be derived.

In case of a public key signature scheme the public verification key may be used to verify a signature, in particular a threshold signature that has been commonly produced by the set of receivers with their new secret shares.

And the public share verification keys may be used to verify the individual signatures that have been produced by a respective receiver with its new secret share.

According to an embodiment, the method further comprises using a public-key encryption scheme with chosen ciphertext attack security for encrypting the secret sub-shares for the receivers.

This further increases the security of the method.

According to an embodiment, the method further comprises using a public-key encryption scheme with forward secrecy for encrypting the secret sub-shares for the receivers.

In such an encryption scheme with forward secrecy the time is divided into epochs and the messages/sub-shares are encrypted to a specific epoch. In the corresponding redistribution scheme of the secret sharing the set of receivers may update its decryption keys to match the current epoch and they may delete the decryption keys for former epochs. Such a scheme ensures that even if a receiver is compromised, it cannot decrypt an old ciphertext comprising secret sub-shares of a past epoch.

This increases the security of the method.

According to embodiments, the encryption scheme with forward secrecy may be implemented as a binary tree encryption scheme. Such a binary tree encryption scheme takes a plaintext as input and encrypts it to a leaf of a binary tree of height X. To each leaf may be associated a decryption key, and a holder of that decryption key can recover the plaintext. There are also decryption keys associated with internal nodes. A decryption key for an internal node lets you derive a decryption key for any children of that node. This means, if you have the decryption key for the root you can derive decryption keys for all leaves. But if you do not have the decryption key for the root, you can only decrypt ciphertexts pertaining to leaves in the subtrees of the decryption keys you hold.

According to a further embodiment the method comprises performing the decrypting of the encrypted sub-shares on a virtual hardware security module or a hardware security module, in particular on a separate process.

The provisioning of such a hardware security module can prevent that an adversary may learn the decryption keys. According to such an embodiment the decryption process including the storage of the decryption key is performed within a hardened, tamper-resistant environment. According to embodiments a hardware security module includes one or more secure crypto-processors.

According to embodiments a combination of such a hardware security module with a public key encryption scheme with CCA-security provides an encryption scheme with proactive security.

According to embodiments, the public-key encryption scheme is a multi-receiver encryption scheme. The multi-receiver encryption scheme is configured to encrypt the sub-shares of a dealer to the public encryption keys of the set of receivers.

According to embodiments, the multi-receiver encryption scheme uses shared randomness to encrypt the sub-shares of the set of dealers to the public encryption keys of the set of receivers. This is particularly efficient.

According to embodiments, the encryption scheme is configured to perform a chunked encryption of the sub-shares, wherein each sub-share is split into a plurality of plaintexts, in particular small plaintexts or in other words plaintexts of modest size, each representing a chunk.

According to an embodiment the method comprises generating, by the set of dealers, a further non-interactive zero-knowledge proof, the further zero-knowledge proof being configured to prove that the chunked encryption is correct. The further zero-knowledge proof may also be denoted as second zero-knowledge proof and the proof that the set of ciphertexts jointly contain a redistribution of a secret share may be denoted as first zero-knowledge proof. According to embodiments the first and the second zero-knowledge proof may also be combined in one common proof.

According to an embodiment, the step of broadcasting the dealings comprises putting the dealings on a bulletin board, i.e., a permanent digital record the receivers can read. According to embodiments such a bulletin board can be implemented e.g. via a blockchain/distributed ledger.

According to embodiments the bulletin board is configured in such a way that the dealings which are placed on the bulletin board are impossible to delete.

According to embodiments the bulletin board is configured in such a way that the dealings authenticate the sender.

According to embodiments the bulletin board is configured in such a way that the dealings that are placed on the bulletin board have a defined order.

According to an embodiment of another aspect a distributed network comprising a plurality of nodes is provided, wherein the distributed network is configured to perform a computer-implemented method for redistribution of a (n,t)-secret sharing according to any of the embodiments as presented above.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

According to an embodiment of another aspect of the invention, a computer program product for operating a node of a distributed network is provided.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein:

FIG. 3 shows a corresponding table comprising a corresponding evolvement of sets of secrets/secret keys of a subnet as well as of the decryption keys of a set of receivers;

FIG. 4 illustrates in a more detailed way computational units running on nodes of the network;

MODES FOR CARRYING OUT THE INVENTION

Figure 1:
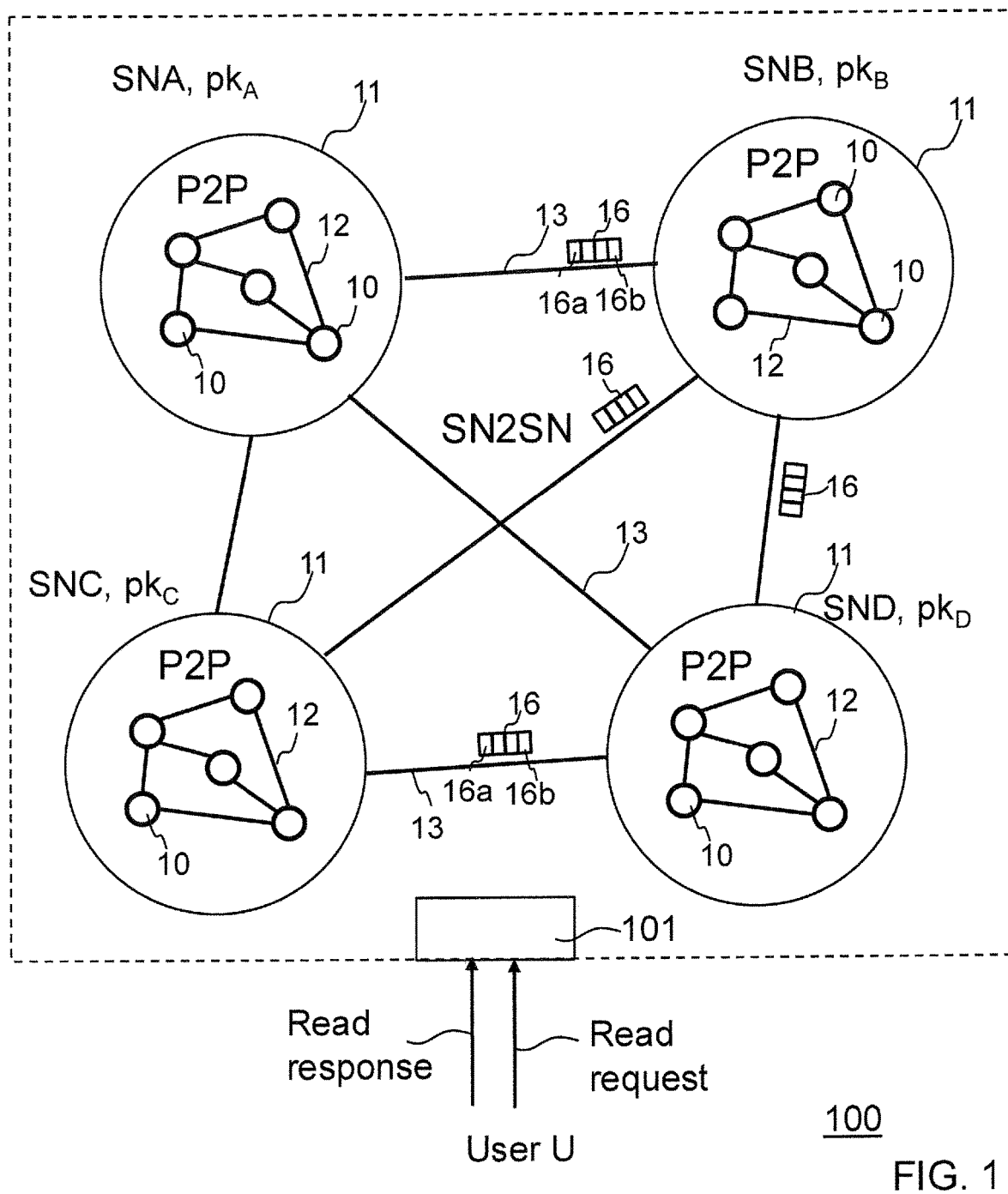
FIG. 1 shows an exemplary block diagram of a distributed network according to an embodiment of the invention.

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be in particular embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

Participants: implemented as pieces of software on distinct physical machines and assumed to have network access to communicate with each other.

Dealers: a set of participants

Receivers: another set of participants, may or may not overlap with the set of dealers Linear secret sharing: a secret sharing scheme where the shares can be computed with a matrix operation of a matrix M applied to the secret s and to some random group elements r, i.e., $(s_1, \ldots, s_n) = (s, r_1, \ldots, r_{t-1})M$.

Shamir secret sharing: a type of threshold secret sharing scheme. Shamir secret sharing is linear.

A verification key is a bit-string of a public key signature scheme intended to be widely publicized. A verification key may also be denoted as public key and may be used e.g. for the verification of digital signatures of the public key signature scheme.

A public encryption key is a bit-string of a public-key encryption scheme.

A public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key or an encryption key, enabling some cryptographic operation, in particular digitally signing a message and/or decrypting a ciphertext.

Distributed key generation (DKG): a protocol enabling a set of dealers to create a public key, in particular a verification key, and provide a set of receivers with a secret share/secret key share of the corresponding secret key.

Secret redistribution protocol: A secret redistribution protocol may also be denoted as a secret resharing protocol. A protocol to update the secret key shares of a secret key or more generally the secret share of a secret. According to some embodiments the protocol may provide the new or updated secret (key) shares to the former holders of the secret (key) shares. According to other embodiments, the protocol may provide the new or updated secret (key) shares to a new, in particular a different set of receivers.

(n,t)-threshold key/threshold secret key: Such a threshold key has a threshold t and a number of secret key shares $s_1, \ldots, s_n$ such that any t secret key shares enable reconstruction of the secret key, while t−1 shares do not suffice to determine the secret key. In case of a threshold public key signature scheme, any t secret key shares enable the execution of a valid signature under the threshold public key/verification key, while t−1 shares do not suffice to execute a valid signature.

A (n,t)-secret sharing of a secret: A sharing comprising n secret shares, wherein a threshold number t≤n of the secret shares is sufficient to reconstruct the secret, while t−1 shares do not suffice to determine the secret.

Verifiable secret sharing (VSS): a protocol enabling a single dealer to generate a random secret s, a threshold secret sharing $s_1, \ldots, s_n$ to the set of receivers, and evidence each receiver can use to verify its share si is correct Proactive security: a security notion capturing a multi-party system tolerating at any time the compromise of t−1 parties. Time is divided into epochs, and in each epoch at most t−1 parties are compromised, but the attacker is mobile in the sense that the set of compromised parties may differ from epoch to epoch.

A distributed key management system with proactive security can be made by dividing time into epochs and using a fresh threshold secret sharing of the secret key in each epoch.

Public-key encryption with forward secrecy: a public-key encryption scheme where time is divided into epochs and the private decryption key evolves over time so that, even if it is compromised it does not aid in decrypting ciphertexts from a previous epoch.

Bulletin board: A system to broadcast incoming messages to all relevant parties. A bulletin board can be implemented e.g. via a blockchain/distributed ledger. A bulletin board may be also denoted as ledger. According to embodiments the messages which are placed on the bulletin board are impossible to delete, they authenticate the sender and they have a well-defined order.

Non-interactive zero-knowledge (NIZK) proof: a proof or proof system, where a single party (prover) generates a cryptographic proof for a claim (statement) such that at least a set of receivers (verifiers) can ascertain that the claim is true, yet learn nothing (zero knowledge) about the underlying reasons (witness) why it is true. Furthermore, the set of receivers do not have to interact with anybody, i.e. neither with the prover nor with any other receiver to verify the proof.

A binary tree encryption scheme: An encryption scheme that takes a plaintext as input and encrypts it to a leaf of a binary tree of height X.

Such a binary tree encryption scheme is e.g. described in [Ran Canetti, Shai Halevi, Jonathan Katz: A Forward-Secure Public-Key Encryption Scheme. J. Cryptology (2007) 20, 265-294].

A multi-receiver encryption scheme: A scheme according to which there is a set of n receivers $1, \ldots, n$. Each of the i receivers has a secret decryption key and public key pair denoted by (dki, pki). A sender then encrypts a set of messages $M1, \ldots, Mn$, where Mi is directed to receiver i, using $pk1, \ldots, pkn$ to get a ciphertext C. Upon receiving the ciphertext C, receiver i decrypts it using its decryption key dki to get message Mi.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are distributed over a plurality of subnetworks 11. The subnetworks 11 may also be denoted as subnets. In the example of FIG. 1, four subnets 11 denoted with SNA, SNB, SNC and SND are provided.

Each of the plurality of subnets 11 is configured to run a set of computational units on each node 10 of the respective subnet 11. According to embodiments a computational unit shall be understood as a piece of software, in particular as a piece of software that comprises or has its own unit state. The unit state may also be denoted as execution state.

The network 100 comprises communication links 12 for intra-subnet communication within the respective subnet 11, in particular for intra-subnet unit-to-unit messages to be exchanged between computational units assigned to the same subnet.

Furthermore, the network 100 comprises communication links 13 for inter-subnet communication between different ones of the subnets 11, in particular for inter-subnet unit-to-unit messages to be exchanged between computational units assigned to different subnets.

Accordingly, the communication links 12 may also be denoted as intra-subnet or Peer-to-Peer (P2P) communications links and the communication links 13 may also be denoted as inter-subnet or Subnet-to-Subnet (SN2SN) communications links.

The network 100 is configured to exchange unit-to-unit messages between the computational units of the network via a messaging protocol based on the subnet-assignment.

According to embodiments, the distributed network may be in particular configured to exchange inter-subnet messages 16 between the subnets SNA, SNB, SNC and SND via a messaging protocol. The inter-subnet messages 16 may be in particular embodied as inter-subnet unit-to-unit messages 16a to be exchanged between computational units that have been assigned to different subnets according to the subnet-assignment. As an example, the distributed network 100 may be configured to exchange a unit-to-unit message 16a between the computational unit $CU_{A1}$ as sending computational unit running on the subnet SNA and the computational unit $CU_{B2}$ as receiving computational unit running on the subnet SNB (see FIG. 4). In addition, the inter-subnet messages 16 may be embodied as signalling messages 16b. The signalling messages 16b may encompass acknowledgement messages (ACK) adapted to acknowledge an acceptance or receipt of the unit-to-unit messages or non-acknowledgement messages (NACK) adapted to not-acknowledge an acceptance (corresponding to a rejection) of the unit-to-unit messages, e.g. to indicate a transmission failure.

According to embodiments, a unit state or execution state shall be understood as all the data or information that is used by the computational unit, in particular the data that the computational unit stores in variables, but also data the computational units get from remote calls. The unit state may represent in particular storage locations in the respective memory locations of the respective node.

According to embodiments of the invention the subnets 11 are configured to replicate the set of computational units across the respective subnet 11. More particularly, the subnets 11 are configured to replicate the unit state/execution state of the computational units across the respective subnet 11.

The network 100 may comprise a plurality of interfaces 101 that may be used to exchange information with users U of the distributed network. As an example, the users U may send read request via the interface 101 to the distributed network and receive a read response, e.g. execution state information comprising computational results. According to preferred embodiments, the user does not need to be aware of the internal structure of the distributed network 100. In particular, the user may preferably not be aware of the subnet configuration and the respective subnet that is handling her read request.

The subnets 11 may be reconfigured over time. More particularly, the number of nodes of the subnets 11 may change over time. As an example, nodes may be added to the subnets 11 and/or nodes may be removed from the subnets 11. Hence the subnets 11 comprise a changeable set of nodes.

Each of the subnets 11 hold an individual or in other words separate static verification key of a public-key signature scheme. In this example the subnet SNA holds a static verification key $pk_A$, the subnet SNB holds a static verification key $pk_B$, the subnet SNC holds a static verification key $pk_C$ and the subnet SND holds a static verification key $pk_D$. A static verification key may be in the following generally referred to as $pk_X$, wherein X denotes a corresponding subnet. According to embodiments the static verification keys $pk_X$ are constant or in other words fixed over the whole lifetime of the respective subnet 11.

The static verification keys $pk_X$ and the corresponding secret shares may be initially generated by a distributed key generation protocol.

While the static verification keys $pk_X$ of the distributed network 100 do not change over time, the corresponding secret key shares $s_i$ may change over time.

Such a change of the secret key shares may be performed in case the set of nodes of the respective subnet has changed or it may be performed even if there is no change of the nodes of the subnet. The latter may be used to provide proactive security.

The change/update of the secret key shares may be performed by a secret-sharing or in other words a secret redistribution protocol.

The distributed key generation protocol may be in particular a threshold key generation protocol. The secret-redistribution protocol may be in particular a threshold secret redistribution protocol.

The distributed key generation protocol may generate a first set of corresponding secret shares $s_1$, $s_2$, $s_n$, i.e. a first set of secret shares that correspond to the respective static verification key $pk_X$ and a secret s. The first set of secret key shares may be assigned to a first set of nodes of the respective subnet. The first set of secret shares may be used to issue a signature which can be verified with the static verification key. The first set of nodes may be in particular the nodes of the respective subnet at a time to or an epoch $e_0$. The time to may be e.g. the time of the creation of the respective subnet. The verification keys $pk_X$ are verification keys of a public-key signature scheme. Accordingly, the verification keys $pk_X$ may be used to verify a joint signature that has been created by the respective nodes which hold the secret shares $s_1, s_2, \ldots s_n$.

In order to change the secret key shares, the distributed network 100 performs a secret-redistribution protocol. As mentioned the secret redistribution protocol may be in particular a threshold protocol and may be generally embodied as a method for redistribution of a (n,t)-secret sharing of a secret s from a set of dealers to a set of receivers. The set of dealers and the set of receivers may be in particular nodes of the distributed network. Hence the secret-redistribution protocol may redistribute the secret shares of the first set of nodes of a respective subnet to a second set of nodes of the respective subnet. This creates a second set of secret shares which corresponds to the same static verification key of the respective subnet. As a result, each node or a subset of the second set of nodes holds one of the secret shares of the second set of shares.

The nodes of the distributed network 100 may use according to embodiments threshold signatures to certify results produced by the distributed network 100.

The nodes of the distributed network 100 may use long-term public encryption keys in order to minimize interaction.

This will be illustrated in more detail with reference to FIG. 2 and FIG. 3.

Figure 2:
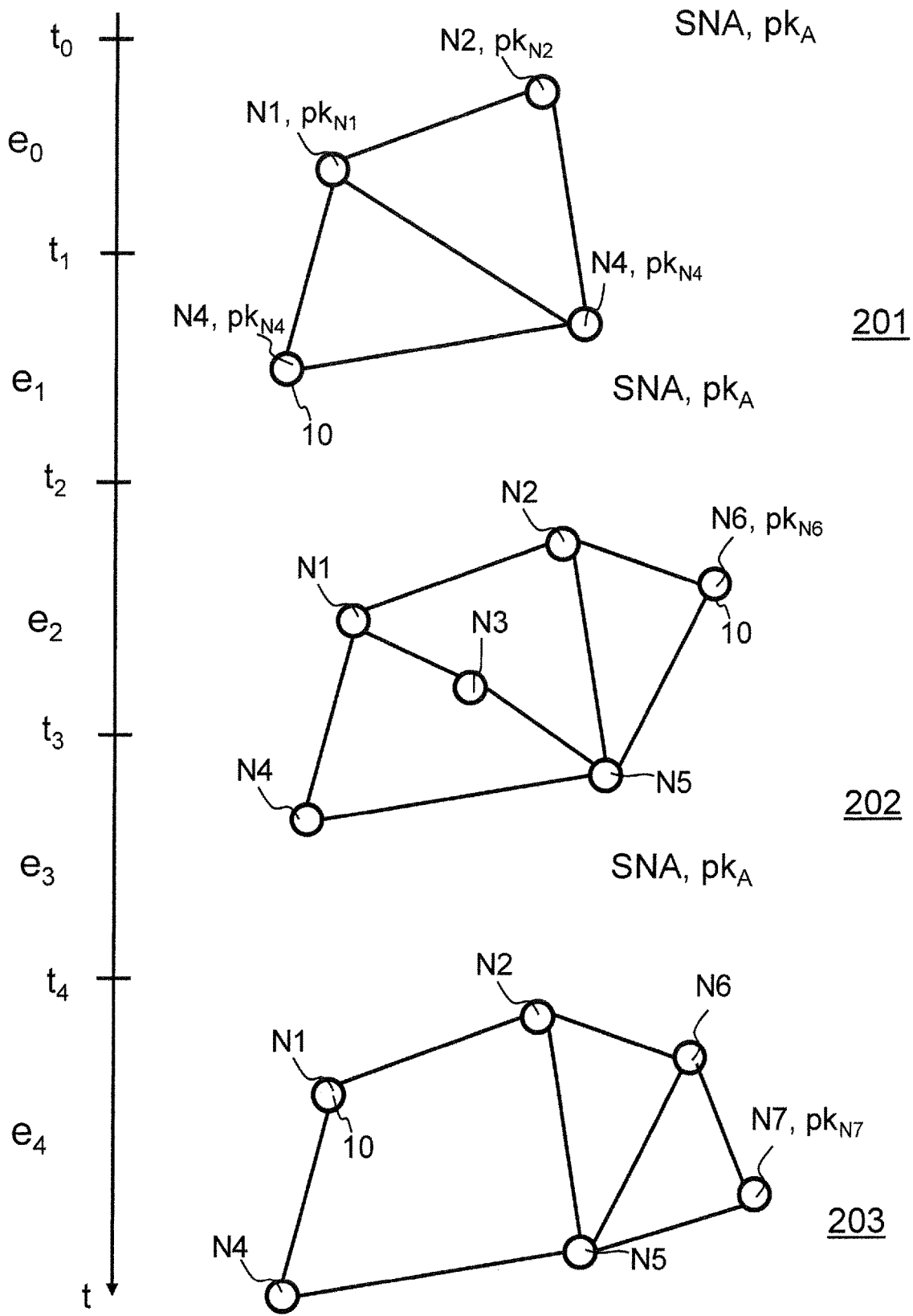
FIG. 2 shows the evolvement of a subnet over time.

FIG. 2 shows the evolvement of a subnet SNA over time. FIG. 3 shows a corresponding table comprising a corresponding evolvement of sets of secret keys of the subnet SNA.

Referring now to FIG. 2, the subnet SNA has initially at a time to, e.g. at the time of its creation, a subnet configuration 201. The respective subnet configuration is valid for a corresponding epoch $e_0$. According to the subnet configuration 201, the subnet SNA comprises 4 nodes N1, N2, N3 and N4. The subnet SNA has a static verification key $pk_A$ of a public key signature scheme. The nodes N1, N2, N3 and N4 establish a first or in other words an initial set of nodes. Each of the nodes of the distributed network 100 has registered a public encryption key to the distributed network 100. Other nodes or users of the distributed network 100 can throughout the lifetime of the node use this public encryption key to encrypt messages to the node.

Accordingly, the nodes N1, N2, N3 and N4 have registered public encryption keys $pk_{N1}$, $pk_{N2}$, $pk_{N3}$ and $pk_{N4}$ respectively. Furthermore, nodes N5, N6 and N7 of future network configurations have registered public encryption keys $pk_{N5}$, $pk_{N6}$ and $pk_{N7}$. As the public encryption keys are also used long-time, they may be denoted as static encryption keys.

While the static verification key $pk_A$ of the subnet SNA as well as the static encryption keys $pk_{N1}$, $pk_{N2}$, $pk_{N3}$, $pk_{N4}$, $pk_{N5}$, $pk_{N6}$ and $pk_{N7}$ are used long-term, the secret key shares $s_i$ corresponding to the static verification key $pk_A$ as well as decryption keys $dk_{N1}$, $dk_{N2}$, $dk_{N3}$, $dk_{N4}$, $dk_{N5}$, $dk_{N6}$ and $dk_{N7}$ corresponding to static encryption keys $pk_{N1}$, $pk_{N2}$, $pk_{N3}$, $pk_{N4}$, $pk_{N5}$, $pk_{N6}$ and $pk_{N7}$ may change over time. More particularly, according to embodiments the time is divided into epochs and the decryption keys and the secret keys shares are changed regularly and are only used/valid for a particular epoch. In the following the secret key shares $s_i$ will be denoted for ease of simplicity just as secret shares $s_i$.

Referring now to FIG. 3, the left column 301 comprises a corresponding number of nodes of the subnet SNA, more particularly the nodes N1, N2, N3, N4, N5, N6 and N7. The columns 302, 303, 304, 305 and 306 comprises the respective secret shares of the corresponding nodes at different points in time. More particularly, column 302 corresponds to the epoch $e_0$ extending from a time $t_0$ to a time $t_1$, column 303 corresponds to an epoch $e_1$ extending from the time $t_1$ to a time $t_2$, column 304 corresponds to an epoch $e_2$ extending from the time $t_2$ to a time $t_3$, column 305 corresponds to an epoch $e_3$ and column 306 corresponds to an epoch $e_4$. The rows 311, 312, 313, 314, 315, 316 and 317 comprise the secret shares of the nodes N1, N2, N3, N4, N5, N6 and N7 respectively as well as the decryption keys of the respective nodes.

As mentioned the public verification key $pk_A$ of the subnet SNA and the corresponding secret s which may also be denoted as secret signing key sk remain constant.

During epoch $e_0$ the nodes N1, N2, N3 and N4 of the subnet SNA hold secret shares $s_{1,0}$, $s_{2,0}$, $s_{3,0}$, and $s_{4,0}$ respectively. In this notation the first number of the subscript denotes the respective node and the second number of the subscript the respective epoch. The secret shares $s_{1,0}$, $s_{2,0}$, $s_{2,0}$, and $s_{4,0}$ may be considered as initial shares which have been generated e.g. with a distributed key generation protocol.

At a subsequent epoch $e_1$, the subnet SNA has still the same set of nodes. Nevertheless, the distributed network has performed a redistribution of the secret shares $s_{2,0}$, $s_{3,0}$ and $s_{4,0}$ to a second set of nodes, which is in this example formed by the same set of nodes N1, N2, N3 and N4.

The redistribution has created or generated a second set of secret shares $s_{1,1}$, $s_{2,1}$, $s_{3,4}$ and $s_{4,1}$ which are different from the first set. The second set of secret shares corresponds to the same static verification key $pk_A$ of the subnet SNA and to the same secret s corresponding to the static verification key $pk_A$.

The secret redistribution protocol which is performed for redistributing the secret shares $s_{1,0}$, $s_{2,0}$, $s_{3,0}$ and $s_{4,0}$ to the secret shares $s_{14}$, $s_{2,1}$, $s_{34}$ and $s_{4,1}$ will now be explained in more detail with reference to FIGS. 5 and 6.

As mentioned, in general the shares are redistributed from a set of dealers to a set of receivers. In this example the set of dealers is equal to the set of receivers and is formed each by the nodes N1, N2, N3 and N4. If the nodes N1, N2, N3 and N4 act as dealers, we will in the following denote them as D1, D2, D3 and D4. Likewise, if they act as receivers, we will refer to them as R1, R2, R3 and R4.

Accordingly, the dealers D1, D2, D3 and D4 aim at redistributing their secret shares of epoch $e_0$ to the receivers R1, R2, R3 and R4 for the next epoch $e_1$.

Figure 5:
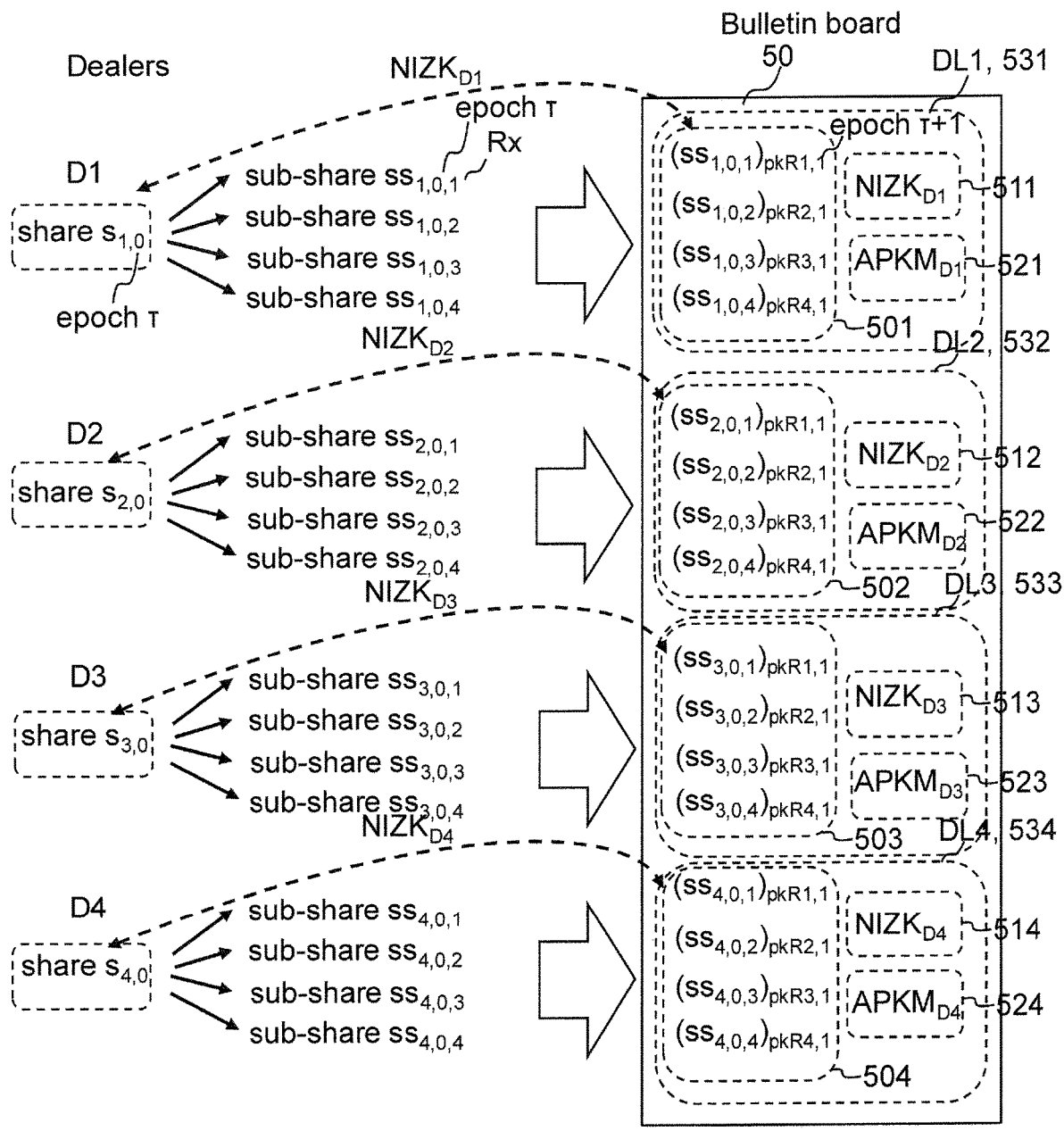
FIG. 5 illustrates the creation and broadcasting of a dealing of a method for redistribution of a secret-sharing.
Figure 6:
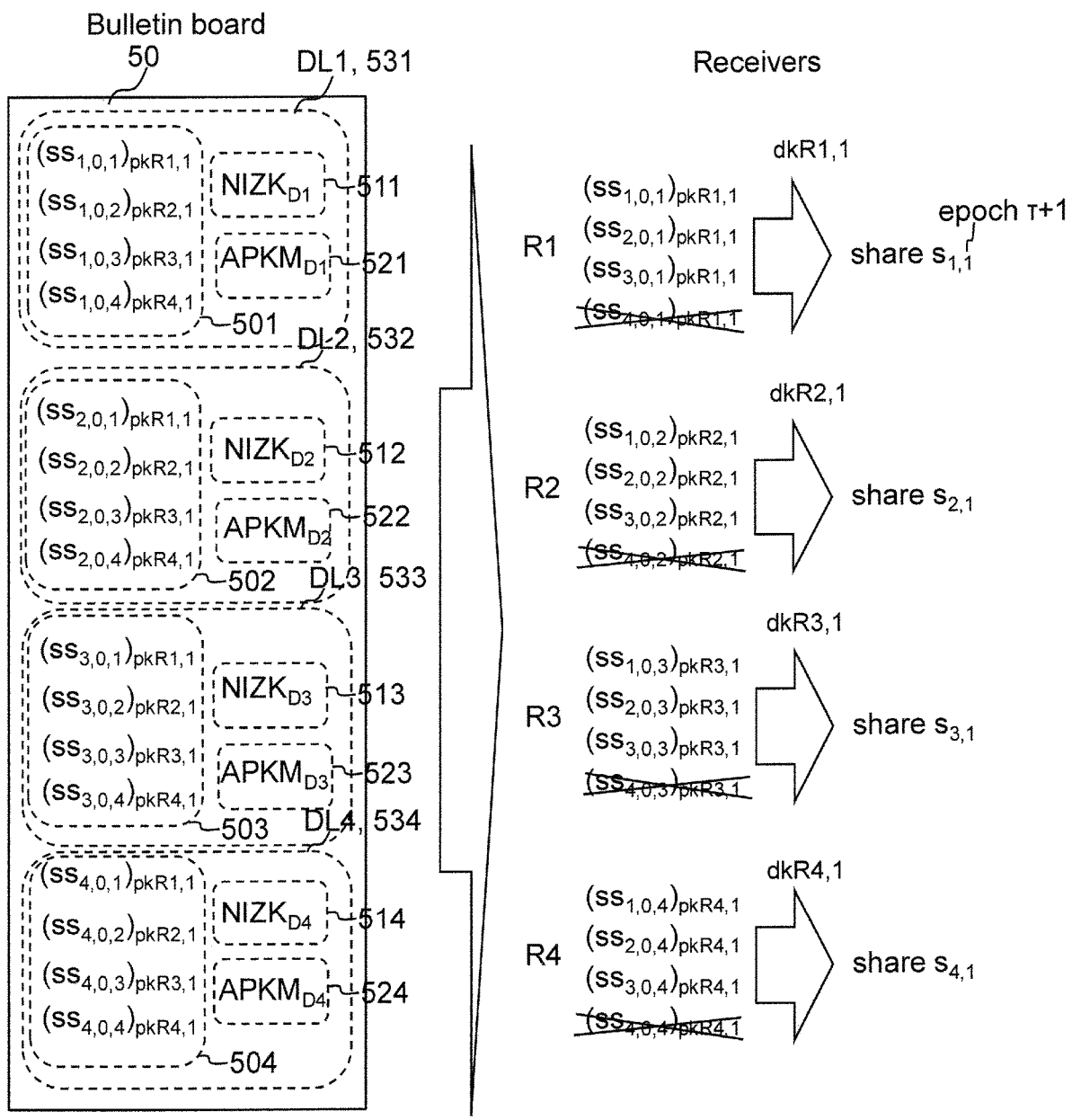
FIG. 6 illustrates how receivers of the dealing of FIG. 5 can verify, decrypt and combine their new shares from the broadcasted dealing.

Assuming that the threshold number t of the secret sharing is 3, at least 3 of the n dealers D1, D2, D3 and D4 will perform the following steps, wherein in FIGS. 5 and 6 it is assumed that all the dealers D1, D2, D3 and D4 will perform these steps.

At first, the dealers D1, D2, D3 and D4 create a (3,4)-secret sharing of its respective secret shares or in general a (n',t')-secret sharing comprising n' secret sub-shares of its respective secret share. Generally a threshold number t'≤n' of the secret sub-shares is sufficient to reconstruct the secret share and in this example it is assumed that 3 of the 4 sub-shares are sufficient to reconstruct the secret share.

As an example, the dealer D1 (node N1) creates 4 sub-shares $ss_{1,0,1}$, $ss_{1,0,2}$, $ss_{1,0,3}$ and $ss_{1,0,4}$ of the share $s_{1,0}$. In this notation the last subscript indicates the respective receiver of the sub-share.

Each of the 4 sub-shares is encrypted to a different one of the receivers R1, R2, R3 and R4. More particularly, the dealer D1 creates a set of ciphertexts which comprises for each receiver an encrypted sub-share of the secret share $S_{1,0}$.

According to an embodiment the dealers use an encryption scheme with forward secrecy, i.e. the dealers encrypt the sub-shares to a specific epoch τ. Accordingly, the nodes acting as receivers have to update their decryption keys to match the current epoch and to delete decryption keys for old epochs. This way, even if the node is compromised, it cannot decrypt an old ciphertext for a past epoch. This reduces the information an adversary may learn.

In the example of FIG. 5, the sub-share $ss_{1,0,1}$ is encrypted with respect to the public encryption key $pk_{R1,1}$ for the next epoch $e_1$ in such a way that a corresponding decryption key $dk_{R1,1}$ of receiver R1 is needed which is only valid for epoch $e_1$. The first subscript of the encryption and decryption keys indicate the respective receiver and the second subscript the epoch. In a corresponding manner the sub-share $ss_{1,0,2}$ is encrypted for epoch $e_1$ in such a way that a corresponding decryption key $dk_{R2,1}$ of receiver R2 is needed which is also only valid for epoch $e_1$. And the sub-shares $ss_{1,0,3}$ and $ss_{1,0,4}$ are encrypted for epoch $e_1$ in such a way that corresponding decryption keys $dk_{R3,1}$ of receiver R3 and $dk_{R4,1}$ of receiver R4 respectively are needed which are also only valid for epoch 1. As a result, the dealer D1 has created 4 ciphertexts $(ss_{1,0,1})_{pkR1,1}$, $(ss_{1,0,2})_{pkR2,1}$, $(ss_{1,0,3})_{pkR3,1}$ and $(ss_{1,0,4})_{pkR4,1}$, which form a set of ciphertexts 501. The subscript of the term in brackets indicates the used public encryption key and the targeted epoch for the decryption.

As an example, the ciphertext $(ss_{1,0,1})_{pkR1,1}$ is encrypted by the encryption key $pk_{K1}$ of receiver R1 (corresponding to node N1) for the epoch $e_1$ and may hence be decrypted by receiver R1 with the decryption key of epoch $e_1$ and the ciphertext $(ss_{1,0,2})_{pkR2,1}$ may be decrypted by receiver R2 with the decryption key of epoch $e_1$.

In a corresponding manner the other nodes N2, N3 and N4 create, in their function as dealers, also 4 sub-shares of their respective share of the epoch 0 and encrypt each of these 4 shares for one of the receivers R1, R2, R3 and R4. As a result, the dealers D2, D3 and D4 have created sets of ciphertexts 502, 503 and 504.

In addition, each of the dealers D1, D2, D3 and D4 generates a zero-knowledge proof that the set of ciphertexts jointly contain a redistribution of its secret share. The zero-knowledge proofs may be in particular non-interactive zero-knowledge proofs (NIZK) embodied in particular as proofs which do not require any interaction of the receivers with anyone else, i.e. they can be independently verified by each of the receivers. The non-interactive zero-knowledge proofs may be publicly verifiable such that anybody, receiver or not, can verify them.

As an example, the dealer D1 creates a non-interactive zero-knowledge proof $NIZK_{D1}$, 511 that the 4 encrypted sub-shares $(ss_{1,0,1})_{pkR1,1}$, $(ss_{1,0,2})_{pkR2,1}$, $(ss_{1,0,3})_{pkR3,1}$ and $(ss_{1,0,4})_{pkR4,1}$ jointly contain a redistribution of the share $s_{1,0}$. Correspondingly, the other dealers D2, D3 and D4 create non-interactive zero-knowledge proofs 512, 513 and 514.

Furthermore, each of the dealers D1, D2, D3 and D4 may generate some associated public key material $APKM_{D1}$, 521; $APKM_{D2}$, 522; $APK_{D3}$, 523 and $APKM_{D4}$, 524.

Then each of the dealers D1, D2, D4 and D4 broadcasts a dealing to the receivers R1, R2, R3 and R4. Each of the dealings comprises the set of ciphertexts for the set of receivers, the corresponding zero-knowledge proof and the associated public key material.

Referring to FIG. 5, the dealer D1 broadcasts a dealing DL1, 531 which comprises the 4 encrypted secret sub-shares $(ss_{1,0,1})_{pkR1,1}$, $(ss_{1,0,2})_{pkR2,1}$, $(ss_{1,0,3})_{pkR3,1}$ and $(ss_{1,0,4})_{pkR4,1}$, the non-interactive zero-knowledge proof $NIZK_{D1}$ and the associated public key material $APKM_{D1}$.

Likewise, the dealer D2 broadcasts a dealing DL2, 532 which comprises the 4 encrypted secret sub-shares $(ss_{2,0,1})_{pkR1,1}$, $(ss_{2,0,2})_{pkR2,1}$, $(ss_{2,0,3})_{pkR3,1}$ and $(ss_{2,0,4})_{pkR4,1}$, the non-interactive zero-knowledge proof $NIZK_{D2}$ and the associated public key material $APKM_{D2}$. And the dealers D3 and D4 broadcast dealings DL3, 533 and DL4, 534 respectively.

The broadcasting may be implemented according to embodiments by putting the dealings DL1, DL2, DL3 and DL4 of the 4 dealers D1, D2, D3 and D4 respectively on a bulletin board 50. The bulletin board 50 may be accessed at least by the set of receivers, in this example by the receivers R1, R2, R3 and R4. According to embodiments the bulletin board may be publicly available. According to embodiments, the bulletin board may be implemented as distributed ledger.

Referring now to FIG. 6, it is illustrated how the receivers R1, R2, R3 and R4 reconstruct their new shares from the broadcasted information presented on the bulletin board 50.

At first, the receivers R1, R2, R3 and R4 check or in other words verify the non-interactive zero-knowledge proofs $NIZK_{D1}$, $NIZK_{D2}$, $NIZK_{D3}$ and $NIZK_{D4}$ of the dealings DL1, DL2, DL3 and DL4 respectively. According to some embodiments, each of the receivers may check/verify the proofs. According to other embodiments, an assigned set of receivers or more generally an assigned set of parties may check the proofs and provide a verification confirmation of the proofs to the set of receivers.

Once a sufficient number t of proofs have been successfully checked/verified, the receivers R1, R2, R3 and R4 may start to reconstruct their new shares. In the example of FIGS. 5 and 6 only 3 of the 4 proofs need to be successfully checked/verified. This is indicated by a crossing of the respective fourth share.

Then each of the 4 receivers R1, R2, R3 and R4 may decrypt its set of ciphertexts across the dealings DL1, DL2, DL3 and DL4. As an example, the receiver R1 may take the ciphertexts $(ss_{1,0,1})_{pkR1,1}$, $(ss_{2,0,1})_{pkR1,1}$, $(ss_{3,0,1})_{pkR1,1}$ from the dealings DL1, DL2 and DL3 respectively and decrypt these ciphertexts with the decryption key dkR1, 1, i.e. the decryption key of receiver R1 for the epoch $e_1$.

Likewise, the receiver R2 may take the ciphertexts $(ss_{1,0,2})_{pkR2,1}$, $(ss_{2,0,2})_{pkR2,1}$ and $(ss_{3,0,2})_{pkR2,1}$ from the dealings DL1, DL2 and DL3 respectively and decrypt these ciphertexts with the decryption key dkR2, 1, i.e. the decryption key of receiver R2 for the epoch $e_1$.

After decrypting 3 of the 4 sub-shares, each of the receivers R1, R2, R3 and R4 may combine their decrypted ciphertexts to a new secret share of the secret. As an example, the receiver R1 may combine the decrypted sub-shares $ss_{1,0,1}$, $ss_{2,0,1}$, and $ss_{3,0,1}$ to a new secret share $s_{1,1}$ of the next (new) epoch $e_1$. Likewise, the receiver R2 may combine the decrypted sub-shares $ss_{1,0,2}$, $ss_{2,0,2}$ and $ss_{3,0,2}$ to a new secret share $s_{2,1}$ of the new epoch $e_1$.

Figure 7:
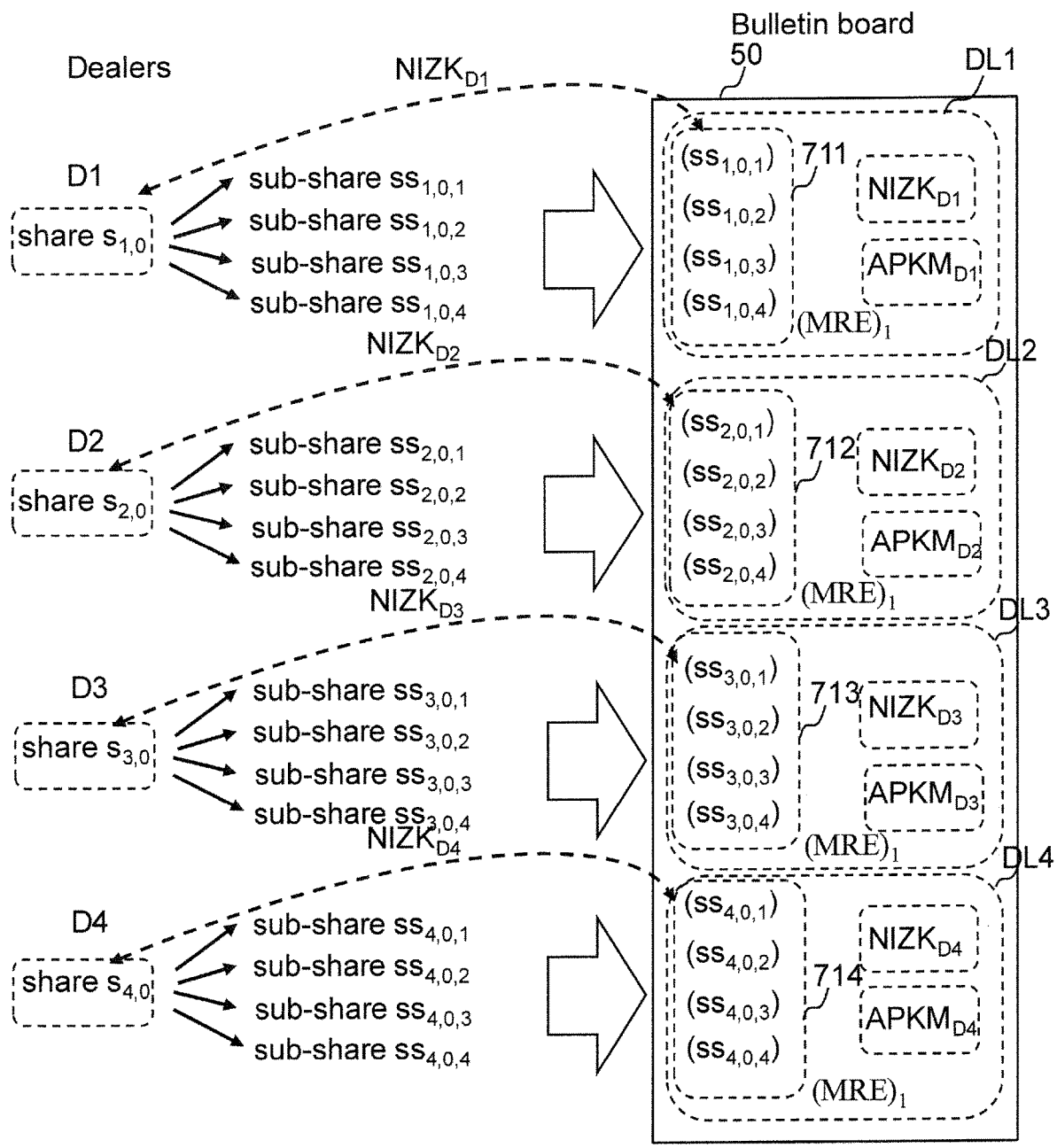
FIG. 7 illustrates the creation and broadcasting of a dealing of a method for redistribution of a secret-sharing which uses a multi-receiver encryption.
Figure 8:
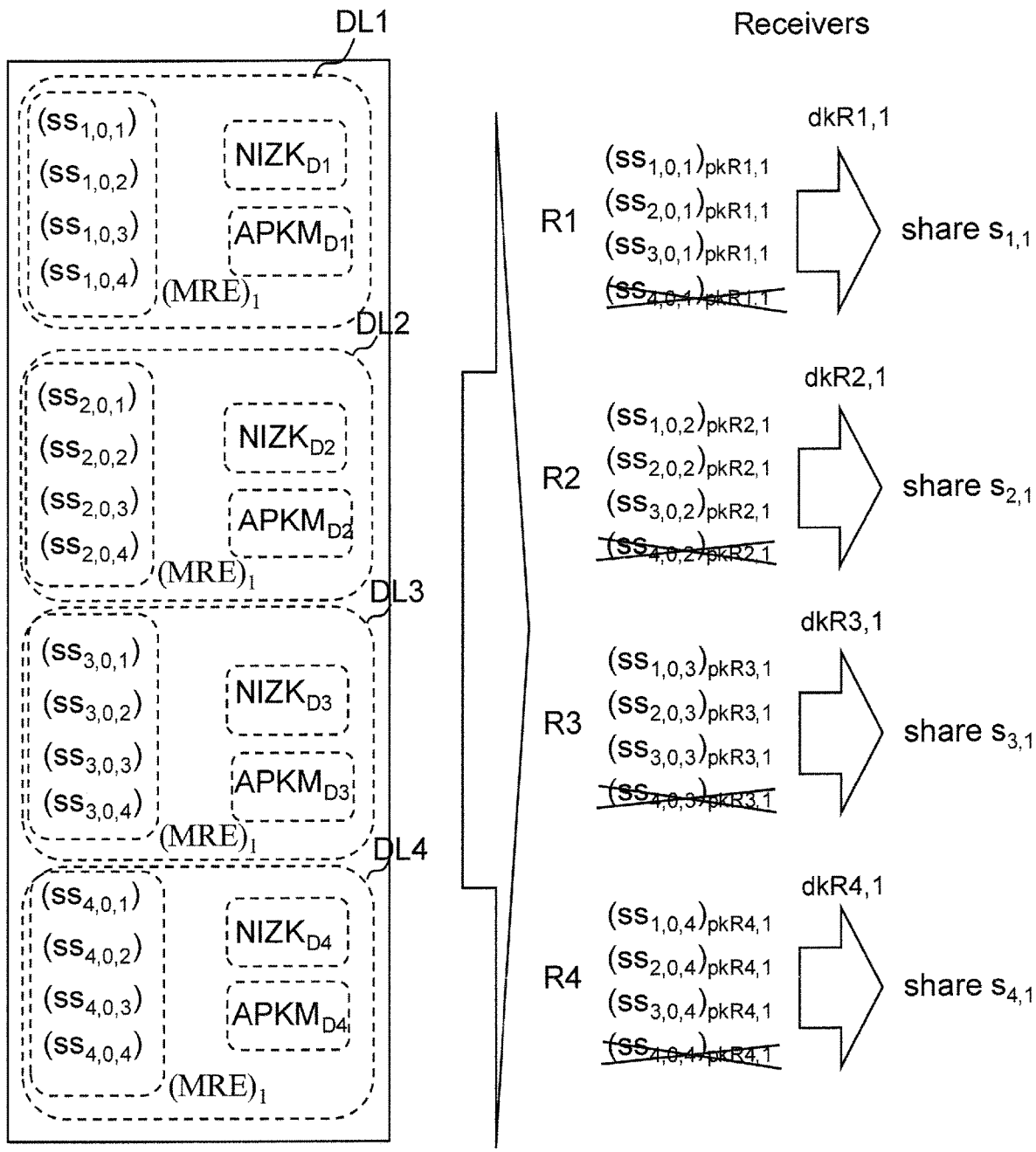
FIG. 8 illustrates how receivers of the dealing of FIG. 7 may verify, decrypt and combine their new shares from the broadcasted dealing.

Referring now to FIGS. 7 and 8, a redistribution of a secret sharing according to another embodiment of the invention is explained. Like in the example of FIGS. 5 and 6, the redistribution protocol is performed for redistributing the secret shares $s_{1,0}$, $s_{2,0}$, $s_{3,0}$ and $s_{4,0}$ of epoch $e_0$ to the secret shares $s_{1,1}$, $s_{2,1}$, $s_{3,1}$ and $s_{4,1}$ of epoch $e_1$.

However, instead of creating separate ciphertexts for each receiver, the embodiment of FIGS. 7 and 8 uses a multi-receiver encryption (MRE). With such a multi-receiver encryption the whole set of sub-shares of each dealer is encrypted together. As an example, the set of sub-shares $ss_{1,0,1}$, $ss_{1,0,3}$ and $ss_{1,0,4}$ of the first dealer D1 is commonly encrypted by means of a multi-receiver encryption $MRE_1$, wherein the subscript denotes the epoch of the multi-receiver encryption/decryption scheme. Likewise, the whole set of sub-shares $ss_{2,0,1}$, $ss_{2,0,2}$, $ss_{2,0,3}$ and $ss_{2,0,4}$ of the second dealer D2 is commonly encrypted by means of a multi-receiver encryption $MRE_1$, wherein the subscript denotes the epoch of the encryption/decryption scheme. As a result, 4 commonly encrypted ciphertexts 711, 712, 713 and 714 are created and placed on the bulletin board 50.

Like in the embodiment as illustrated in FIGS. 5 and 6, each of the dealers D1, D2, D3 and D4 generates a non-interactive zero-knowledge proof that the set of ciphertexts jointly contain a redistribution of its secret share. Furthermore, each of the dealers D1, D2, D3 and D4 may generate some associated public key material.

Referring now to FIG. 8, it is illustrated how the receivers R1, R2, R3 and R4 reconstruct their new shares from the broadcasted information presented on the bulletin board 50.

At first, like in the example as illustrated in FIGS. 5 and 6, the receivers R1, R2, R3 and R4 check or in other words verify the non-interactive zero-knowledge proofs $NIZK_{D1}$, $NIZK_{D2}$, $NIZK_{D3}$ and $NIZK_{D4}$ of the dealings DL1, DL2, DL3 and DL4 respectively.

Once a sufficient number t of proofs have been successfully checked/verified, the receivers R1, R2, R3 and R4 may start to reconstruct their new shares from the commonly encrypted ciphertexts 711-714. Each of the 4 receivers R1, R2, R3 and R4 may decrypt its set of ciphertexts across the dealings DL1, DL2, DL3 and DL4. As an example, the receiver R1 decrypts at least 3 of the commonly encrypted sub-shares $ss_{1,0,1}$ $ss_{2,0,1}$, $ss_{3,0,1}$ and $ss_{4,0,1}$ from the dealings DL1, DL2, DL3 and DL4 respectively with the decryption key dkR1,1 of the multi-receiver encryption scheme $MRE_1$, i.e. the decryption key dkR1, 1 of receiver R1 of the multi-receiver encryption scheme for the epoch $e_1$.

Likewise, the receiver R2 decrypts at least 3 of the sub-shares $ss_{1,0,2}$, $ss_{2,0,2}$ $ss_{3,0,2}$ and $ss_{4,0,2}$ from the dealings DL1, DL2, DL3 and DL4 respectively with the decryption key dkR2,1 of the multi-receiver encryption scheme $MRE_1$ of epoch e1.

After decrypting at least 3 of the 4 sub-shares, each of the receivers R1, R2, R3 and R4 may combine their decrypted ciphertexts to a new secret share of the secret.

Referring now to FIG. 2, a second subnet configuration 202 of the subnet SNA is shown which comprises additional nodes N5 and N6 in addition to the former nodes N1, N2, N3 and N4. This subnet configuration 202 is valid for epochs $e_2$ and $e_3$.

Referring now to FIG. 3, column 304 shows the secret key shares of the new node set at epoch $e_2$.

The distributed network has performed the secret redistribution protocol to redistribute the secret key shares s1,1, s2,1, s3,1, and s4,1 to another set of nodes, which is in this example formed by the enhanced set of nodes N1, N2, N3, N4, N5 and N6.

The redistribution of the secret sharing has created or generated a set of secret shares $s_{1,2}$, $s_{2,2}$, $s_{3,2}$, $s_{4,2}$, $s_{5,2}$ and $s_{6,2}$ which are different from the second set and in particular comprise 6 key shares instead of the former 4 key shares. Again, the set of key shares corresponds to the same static verification key $pk_A$ of the subnet SNA.

At a subsequent epoch $e_3$, the subnet SNA has still the same set of nodes N1, N2, N3, N4, N5 and N6. The distributed network has performed the secret redistribution protocol to redistribute the secret shares $s_{1,2}$, $s_{2,2}$, $s_{3,2}$, $s_{4,2}$, $s_{5,2}$ and $s_{6,2}$. Accordingly, the secret-redistribution protocol has created or generated another new set of secret shares $s_{1,3}$, $s_{2,3}$, $s_{3,3}$, $s_{4,3}$, $s_{5,3}$ and $s_{6,3}$ which are different from the previous set. The new set of key shares corresponds again to the same static verification key $pk_A$ of the subnet SNA.

Referring now to FIG. 2, a third subnet configuration 203 of the subnet SNA is shown which comprises an additional node N7, while the former node N3 has been removed. This subnet configuration 203 is valid for an epoch e4.

Referring back to FIG. 3, column 306 shows the secret key shares of the new node set at time $t_4$.

The distributed network has performed the secret redistribution protocol to redistribute the secret shares $s_{1,3}$, $s_{2,3}$, $s_{3,3}$, $s_{4,3}$, $s_{5,3}$ and $s_{6,3}$ to the new set of nodes N1, N2, N4, N5, N6 and N7.

Accordingly, the secret-redistribution protocol has created or generated another new set of secret shares $s_{1,4}$, $s_{2,4}$, $s_{4,4}$, $s_{5,4}$, $s_{6,4}$ and $s_{7,4}$ which are again different from the previous set and which corresponds again to the same static verification key $pk_A$ of the subnet SNA.

FIG. 4 illustrates in a more detailed way computational units 15 running on nodes 10 of the network 100. The network 100 is configured to assign each of the computational units which are running on the network 100 to one of the plurality of subnets, in this example to one of the subnets SNA, SNB, SNC or SND according to a subnet-assignment. The subnet-assignment of the distributed network 100 creates an assigned subset of the whole set of computational units for each of the subnets SNA, SNB, SNC and SND.

More particularly, FIG. 4 shows on the left side 401 a node 10 of the subnet SNA of FIG. 1. The subnet assignment of the distributed network 100 has assigned a subset of five computational units 15 to the subnet SNA more particularly the subset of computational units $CU_{A1}$, $CU_{A2}$, $CU_{A3}$, $CU_{A4}$ and $CU_{A5}$. The assigned subset of computational units $CU_{A1}$, $CU_{A2}$, $CU_{A3}$, $CU_{A4}$ and $CU_{A5}$ runs on each node 10 of the subnet SNA. Furthermore, the assigned subset of computational units $CU_{A1}$, $CU_{A2}$, $CU_{A3}$, $CU_{A4}$ and $CU_{A5}$ is replicated across the whole subnet SNA such that each of the computational units $CU_{A1}$, $CU_{A2}$, $CU_{A3}$, $CU_{A4}$ and $CU_{A5}$ traverses the same unit states/execution states. This may be implemented in particular by performing an active replication in space of the unit states of the computational units $CU_{A1}$, $CU_{A2}$, $CU_{A3}$, $CU_{A4}$ and $CU_{A5}$ on each of the nodes 10 of the subnet SNA.

Furthermore, FIG. 4 shows on the right side 402 a node 10 of the subnet SNB of FIG. 1 on which four computational units 15 are run, more particularly the set of computational units $CU_{B1}$, $CU_{B2}$, $CU_{B3}$ and $CU_{B4}$. The set of computational units $CU_{B1}$, $CU_{B2}$, $CU_{B3}$ and $CU_{B4}$ runs on each node 10 of the subnet SNB. Furthermore, the set of computational units $CU_{B1}$, $CU_{B2}$, $CU_{B3}$ and $CU_{B4}$ is replicated across the whole subnet SNB such that each of the computational units $CU_{B1}$, $CU_{B2}$, $CU_{B3}$ and $CU_{B4}$ has the same unit state, e.g. by performing an active replication in space of the unit state as mentioned above.

Figure 9:
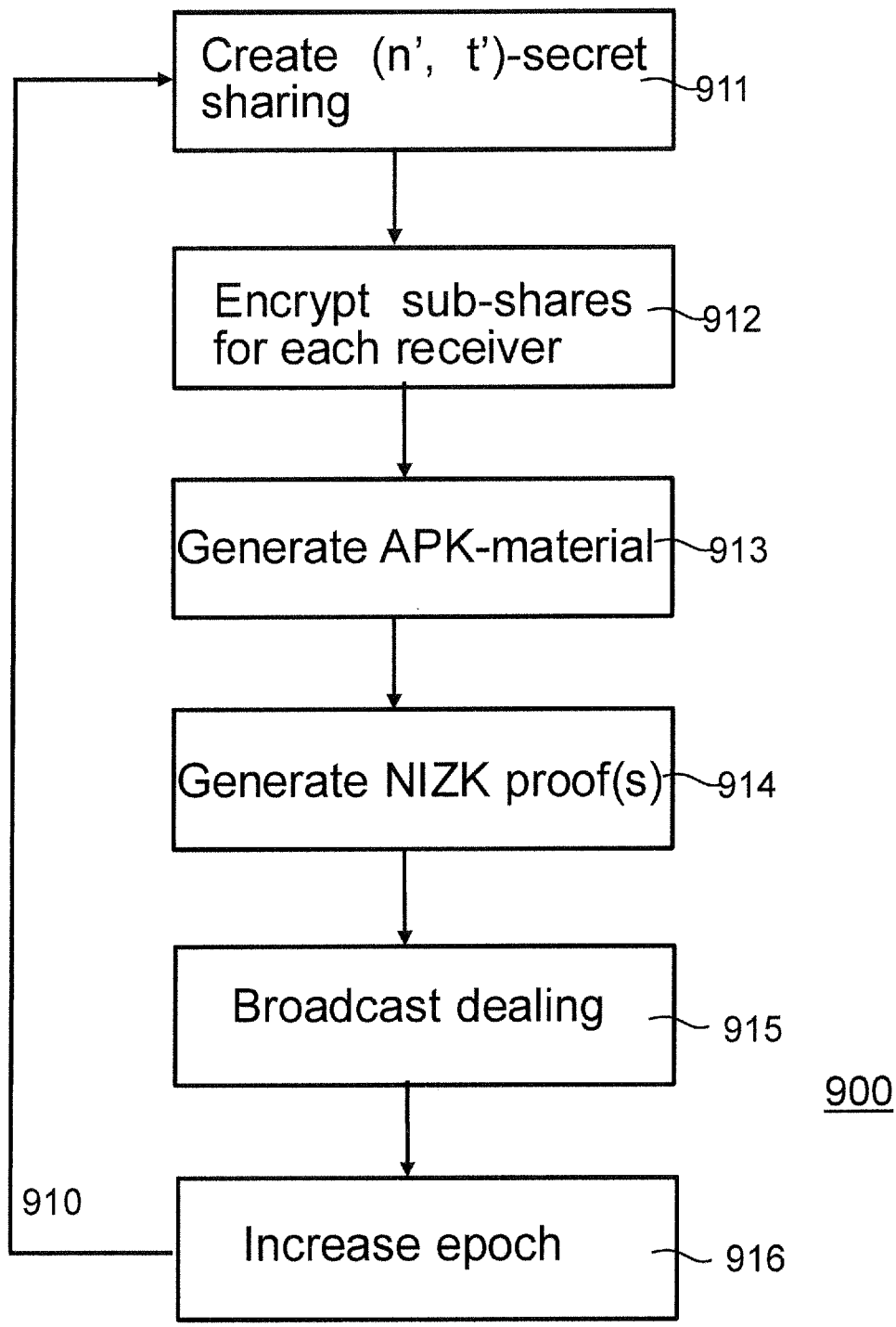
FIG. 9 shows a flow chart of method steps of a method according to an embodiment of the invention.

FIG. 9 shows a flow chart of method steps of a method according to an embodiment of the invention. The method performs a redistribution of a (n,t)-secret sharing of a secret s from a set of dealers to a set of receivers. The (n,t)-secret sharing comprises n secret shares, wherein a threshold number t n of the secret shares is sufficient to reconstruct the secret s, wherein n and t are integers. Each of the n secret shares is held by one of the dealers.

The method performs a plurality of processing loops 910 in a sequential order with an increasing index N. N is an increasing integer, i.e. e.g. 0, 1, 2, 3 . . . N.

The processing loops 910 encompass a first loop step 911, a second loop step 912, a third loop step 913, a fourth loop step 914, a fifth loop step 915 and a sixth loop step 916.

The loop-steps 911-916 are performed by each of at least the threshold number t of dealers.

At the loop-step 911, the respective dealer, e.g. a node of a distributed network, creates a (n',t')secret sharing of its respective secret share, wherein n' and t' are integers and the (n',t')-secret sharing comprises n' secret sub-shares of its respective secret share. A threshold number t'≤n' of the secret sub-shares is sufficient to reconstruct the dealer's secret share.

At the loop-step 912, the respective dealer encrypts for each receiver a sub-share of the n' secret sub-shares and thereby creates a set of ciphertexts. The encrypted secret sub-share is encrypted to/with respect to a public encryption key of the respective receiver. The public encryption keys of the receivers are preferably long-term public encryption keys which have been activated e.g. for communication between nodes of a distributed network.

According to embodiments a public-key encryption scheme with forward secrecy may be used at the loop step 912. According to embodiments, the encryption scheme with forward secrecy is a binary tree encryption scheme. According to further embodiments, the public-key encryption scheme is a multi-receiver encryption scheme.

According to some embodiments the multi-receiver encryption scheme may perform a chunked encryption of the sub-shares, wherein the plaintext of each sub-share represents a chunk.

At the loop-step 913, each dealer creates public key material associated to its secret share. The associated public key material may generally comprise public group elements which are related to the secret shares and a public group element related to the secret. As mentioned above, the secret may be in particular a secret key corresponding to a public verification key of a public key signature scheme. According to such an embodiment the associated public key material may comprise public share verification keys which are related to the secret shares and a public verification key related to the secret.

At the loop-step 914, each of the dealers generates a non-interactive zero-knowledge proof that the set of ciphertexts that it has created jointly contain a redistribution of its secret share. In case of a chunked encryption as mentioned each of the dealers generates a further or in other words second non-interactive zero-knowledge proof to prove that the chunked encryption is correct.

A detailed embodiment of a non-interactive zero-knowledge (NIZK) proof for correct secret sharing that may be used according to embodiments of the invention is presented in chapter 3.3 of the Annex further below.

A detailed embodiment of a non-interactive zero-knowledge (NIZK) proof for correct chunking that may be used according to embodiments of the invention is presented in chapter 3.4 of the Annex further below.

However, according to embodiments other non-interactive zero-knowledge proofs for correct secret sharing and correct chunking may be used. A As an example, non-interactive zero-knowledge proofs as described e.g. in [De Santis, Di Crescenzo, Ostrovsky, Persiano, Sahai: Robust Non-interactive Zero Knowledge: Crypto 2001: 566-598] or [Grath, Maller: Snarky Signatures: Minimal Signatures of Knowledge from Simulation-Extractable SNARKs. Crypto 2017: 581-612] may be used according to embodiments of the invention.

Then, at a loop-step 915, each of the dealers broadcasts a dealing to the set of receivers. Each of the dealings comprises encrypted sub-shares forming the set of ciphertexts, the corresponding non-interactive zero-knowledge proof or proofs as well as the associated public key material.

Next, at a loop step 916, the epoch may be increased by 1 and the steps of the loop 910 may be repeated for the new epoch.

Figure 10:
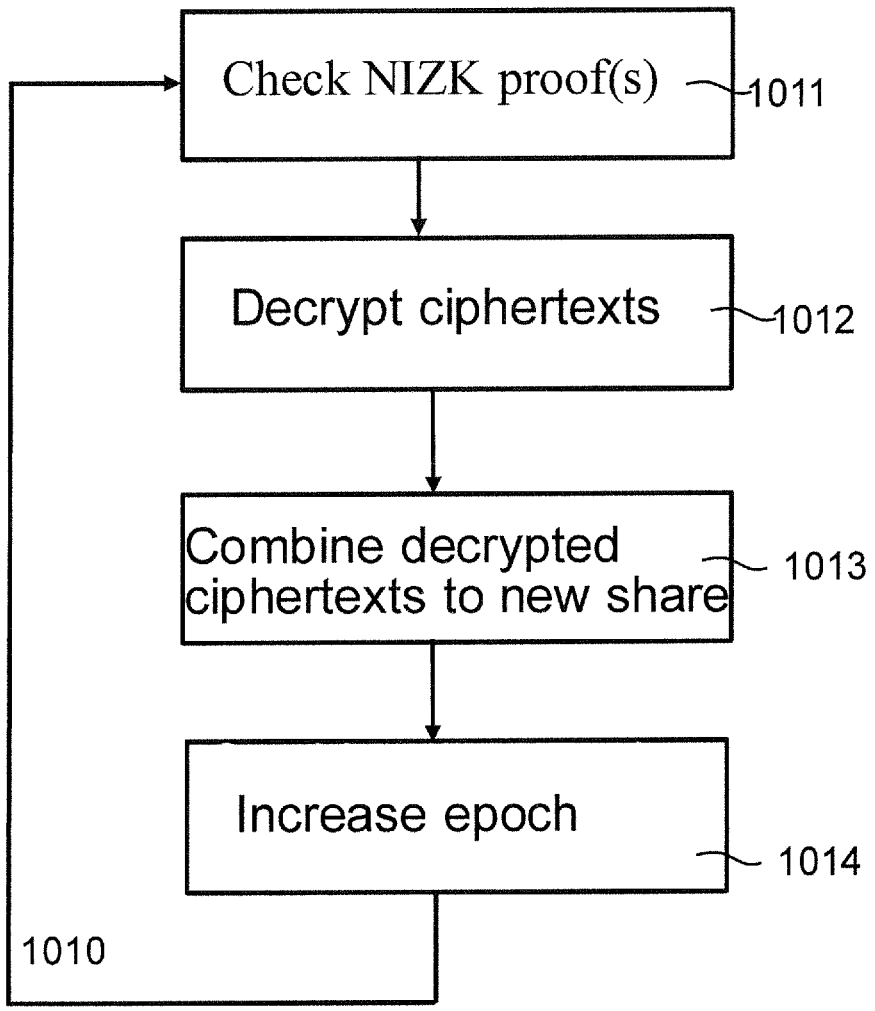
FIG. 10 shows a flow chart of further method steps of a method according to an embodiment of the invention.

FIG. 10 shows a flow chart of further method steps of a method according to an embodiment of the invention. More particularly it illustrates how the set of receivers can reconstruct a new share from the broadcasted dealings.

The method performs a plurality of processing loops 1010 in a sequential order with an increasing index N. N is an increasing integer, i.e. e.g. 0, 1, 2, 3 . . . N.

The processing loops 1010 encompass a first loop step 1011, a second loop step 1012, a third loop step 1013 and a fourth loop step 1014.

At the loop-step 1011 the set of receivers check the non-interactive zero-knowledge proofs of the dealings. Once a sufficient number t' of proofs corresponding to the threshold of the new secret sharing has been successfully checked, each of the receivers may, at the loop step 1012 decrypt its encrypted sub-shares across the dealings, more particularly at least the threshold number of its sub-shares.

Then, at the loop-step 1013, each of the receivers combines the decrypted sub-shares to a new secret share of the secret.

Next, at a loop step 1014, the epoch may be increased by 1 and the loop 1010 may perform the above described steps again for the new epoch.

Figure 11:
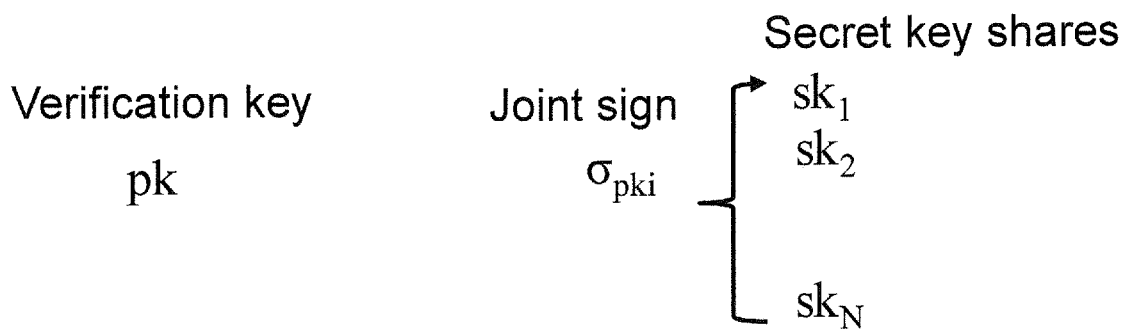
FIG. 11 illustrates embodiments of the verification keys and its corresponding secret key shares which may be used according to embodiments of the invention.

FIG. 11 illustrates embodiments of the verification keys and its corresponding secret key shares which may be used according to embodiments of the invention. FIG. 11 shows an embodiment of a key set 1110 which is generated by a distributed key generation protocol according to an embodiment of the invention. The distributed key generation protocol is embodied as distributed threshold key generation protocol.

It is assumed for this example that a number N of nodes participate in the distributed key generation protocol. The nodes may generally be the nodes of any subnet or in particular the nodes of a governance subnet which has been assigned for the initial generation of the static verification keys of the subnets and an initial subset of corresponding secret key shares.

Each of the N nodes have a secret key share $sk_i$, wherein i=1, . . . , N. The N nodes generate jointly a common static verification key (public key) $pk_X$ for a respective subnet X, wherein a predefined threshold, e.g. at least two thirds or a third of the nodes need to agree on the static verification key and jointly sign the new static verification key to generate a threshold signature $\sigma_{pkX}$.

Figure 12:
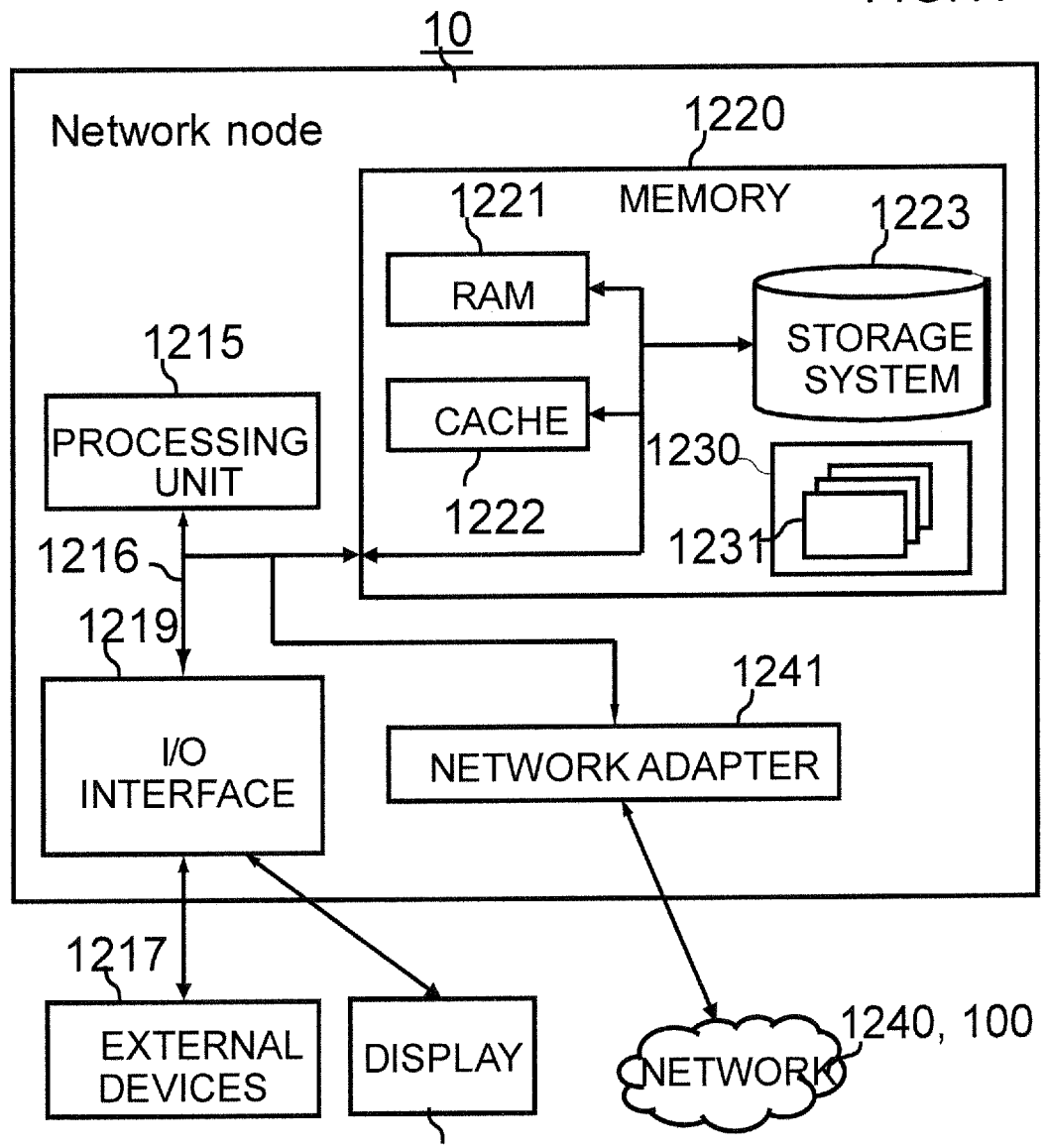
FIG. 12 shows a more detailed block diagram of a network node according to embodiments of the invention.

Referring now to FIG. 12, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be configured to perform or participate in a computer-implemented method according to embodiments of the invention. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1215, a system memory 1220, and a bus 1216 that couples various system components including system memory 1220 to processor 1215.

Bus 1216 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 1220 can include computer system readable media in the form of volatile memory, such as random access memory (RAM) 1221 and/or cache memory 1222. Network node 1210 may further include other removable/non-removable, volatile/non-volatile computer system storage media. By way of example only, storage system 1223 can be provided for reading from and writing to a non-removable, non-volatile magnetic media (not shown and typically called a "hard drive"). As will be further depicted and described below, memory 1220 may include at least one computer program product having a set (e.g., at least one) of program modules that are configured to carry out the functions of embodiments of the invention.

Program/utility 1230, having a set (at least one) of program modules 1231, may be stored in memory 1220 by way of example, and not limitation, as well as an operating system, one or more application programs, other program modules, and program data. Each of the operating system, one or more application programs, other program modules, and program data or some combination thereof, may include an implementation of a networking environment. Program modules 1231 generally carry out the functions and/or methodologies of embodiments of the invention as described herein. Program modules 1231 may carry out in particular one or more steps of a computer-implemented method for performing inter-subnet communication including a consensus protocol in a distributed network, e.g. of one or more steps of the methods as described above.

Network node 10 may also communicate with one or more external devices 1217 such as a keyboard or a pointing device as well as a display 1218. Such communication can occur via Input/Output (I/O) interfaces 1219. Still yet, network node 10 can communicate with one or more networks 40 such as a local area network (LAN), a general wide area network (WAN), and/or a public network (e.g., the Internet) via network adapter 1241. According to embodiments the network 1240 may be in particular a distributed network comprising a plurality of network nodes 10, e.g. the network 100 as shown in FIG. 1. As depicted, network adapter 1241 communicates with the other components of network node 10 via bus 1216.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves.

Computer readable program instructions described herein can be downloaded to respective computing/processing devices from a computer readable storage medium or to an external computer or external storage device via a network, for example, the Internet, a local area network, a wide area network and/or a wireless network.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While above and in the annex there are shown and described presently preferred embodiments of the invention, it is to be distinctly understood that the invention is not limited thereto but may be otherwise variously embodied and practiced within the scope of the claims.

Annex with protocol details

In the following a detailed embodiment of a non-interactive distributed key generation and key redistribution protocol with forward secrecy according to an embodiment of the invention is described in detail.

1 Technical background

1.1 Notation

In the following we write $y := x$ for assigning $y$ the value $x$. Sampling from a probability distribution, we write $y \leftarrow \mathcal{D}$. When $\mathcal{D}$ samples uniformly at random from a set $S$, we write $y \xleftarrow{\$} S$. For repeated independent and uniformly random sampling we write $y_1, \ldots, y_n \xleftarrow{\$} S$. In practice, sampling will not be uniformly random but instead pseudorandom done through the use of a pseudorandom number generator, which will work fine in instantiations of our protocol.

Let $A$ be an algorithm, which may be randomized. We write $y \leftarrow A(x)$ for assigning $y$ the output of $A$ running on input $x$. If the algorithm is deterministic there is only one possible output, and we will sometimes write $y := A(x)$. We may also think of a randomized algorithm as a deterministic computation based on the input $x$ and some randomness $r$, in which case we can write $y := A(x; r)$.

We write $A^H$ for an algorithm that has access to an oracle $H$, which may be thought of as a subroutine. The oracle provides some interface to the algorithm to which it can send an input and get back an output from the oracle. If for instance $H$ is a hash function, we can write $A^H$ for an algorithm that can call the hash function on a message and get back a message digest.

Many protocols depend on parameters, e.g., a hash function may have output length $\lambda = 256$. In general we use $\lambda$ to denote a parameter that indicates the size of an object, e.g., $\lambda_e$ could be the bit-length of an integer $e$. It depends on the setting whether it is more natural to consider a value a parameter that is implicitly known to all and part of the setup of a protocol, or whether it is more natural to give it as explicit input to algorithms.

1.2 Fields, groups and pairings

We write $\mathbb{Z}_p$ for integers modulo $p$. In this article, $p$ will always be a known prime and therefore $\mathbb{Z}_p$ is a finite field (also sometimes written $\mathbb{F}_p$). $\mathbb{Z}_p$ comes with a canonical representation of field elements as integers $0, 1, \ldots, p-1$ and accordingly there are efficient algorithms to compute the field operations. We write $\mathbb{Z}_p^*$ for the multiplicative subgroup of the field, i.e., $\{1, \ldots, p-1\}$. We write $y := x \bmod p$ for assigning to $y$ the canonical representation of $x$ modulo $p$.

We write $\mathbb{G}$ for a group of known prime order $p$. All prime order groups are cyclic, so using multiplicative notation $\mathbb{G} = \{1, g^1, \ldots, g^{p-1}\}$ for some generator $g$, where the unit is $1 = g^0$. When we refer to groups we always assume they have known prime order, a canonical and compact representation of group elements, and efficient algorithms to compute group operations and decide membership.

We use pairing-based cryptography, where we have two source groups $\mathbb{G}_1, \mathbb{G}_2$ and a target group $\mathbb{G}_T$ of known prime order $p$. A pairing (in cryptographic parlance, deviating from standard mathematical terminology) is a non-degenerate bilinear map $e : \mathbb{G}_1 \times \mathbb{G}_2 \to \mathbb{G}_T$. This means if $g_1, g_2$ are generators of $\mathbb{G}_1, \mathbb{G}_2$, when $e(g_1, g_2)$ generates $\mathbb{G}_T$ and for all $a, b \in \mathbb{Z}_p$ we have $e(g_1^a, g_2^b) = e(g_1, g_2)^{ab}$. We require that the pairing be efficiently computable.

In embodiments, we instantiate the pairing groups using BLS12-381 where the group order $p \approx 2^{255}$. The source groups are elliptic curves over a field of size $q \approx 2^{381}$ and the target group is an order $p$ multiplicative subgroup of $\mathbb{F}_{q^{12}}^*$. But one can also make other choices of groups with pairings.

1.3 Hash functions and extendable output functions

We rely on cryptographic hash functions to compress data. A standard cryptographic hash functions is an efficiently computable function $H : \{0,1\}^* \to \{0,1\}^\lambda$ that takes arbitrary length input and maps it to a $\lambda$-bit string, where $\lambda$ is a fixed value. An example is SHA-256, which hashes arbitrary input into 256-bit strings.

We will not just hash to fixed length outputs though. We therefore write $H_\lambda : \{0,1\}^* \to \{0,1\}^\lambda$ for a function that maps arbitrary length input to a string of specified length $\lambda$. We also sometimes map into a group and write $H_\mathbb{G} : \{0,1\}^* \to \mathbb{G}$ for a function that maps into the group $\mathbb{G}$. And we may map into a field, which we write as $H_{\mathbb{Z}_p} : \{0,1\}^* \to \mathbb{Z}_p$. When the codomain is clear from context we will often omit it and simply write $H$ instead of e.g. $H_{\mathbb{Z}_p}$.

There are known technique to convert regular hash functions to hash functions with particular output domains. For instance to get a hash function $H : \{0,1\}^* \to \mathbb{Z}_p$ apply a hash function such as SHA256 to the input $x$ giving you a 256-bit value $h$. Use a PRNG, e.g. ChaCha20 to extend the message digest $h$ to $|p| + 256$ bits $r$. Then return $y = r \mod p$.

1.4 Shamir secret sharing and Lagrange interpolation

According to embodiments, a linear secret sharing scheme such as Shamir secret sharing can be used to share the secret key of a signature scheme. In this subsection we detail Shamir secret sharing and Lagrange interpolation.

Threshold secret sharing enables a dealer with a secret $s$ to create shares $s_1, \ldots, s_n$ such that any $t$ shares suffice to compute the secret $s$, while $t - 1$ shares reveal no information about the secret.

Shamir secret sharing (Adi Shamir: How to Share a Secret. Commun. ACM 22(11): 612-613 (1979)) is a popular secret sharing scheme for secrets in a field $\mathbb{Z}_p$. The idea is to choose a random degree $t - 1$ polynomial $a(x)$ such that $a(0) = s$ and let the shares be $s_1 = a(1), \ldots, s_n = a(n)$.[1] The idea behind

---

[1] It is straightforward to generalize Shamir secret sharing to use any $n + 1$ distinct indices in $\mathbb{Z}_p$ for the secret and the $n$ shares, and our constructions can easily be extended to do so, but for simplicity we just use the indices $0, 1, \ldots, n$ in this annex.

this secret sharing is that any $t$ distinct points on a degree $t-1$ polynomial uniquely determines it and allows reconstruction of the secret. On the other hand, given $t-1$ distinct points (with non-zero $x$-coordinate) there are $p$ possible polynomials through them, each yielding a different secret, so they do not give any information about the secret.

To describe Shamir secret sharing formally, let us first define the Lagrange interpolation polynomials over $\mathbb{Z}_p$. Given a set $I = \{i_1, \ldots, i_t\}$ of distinct indices and an index $i_j \in I$, we define $$L_{i_j}^I(x) = \prod_{i \in I \setminus \{i_j\}} \frac{x-i}{i_j - i} \bmod p.$$

We observe, that all the Lagrange polynomials have degree $t-1$ and satisfy $L_{i_j}^I(i_k) = 1$ for $k = j$ and $L_{i_j}(i_j) = 0$ for $k \neq j$. Consequently, given points and shares $(i_1, a(i_1)), \ldots, (i_t, a(i_t))$ on a degree $t-1$ polynomial $a(x)$, we see $$a(x) = \sum_{i_j \in I} L_{i_j}^I(x) a(i_j) \bmod p.$$

With a secret sharing where $s_{i_1} = a(i_1), \ldots, s_{i_t} = a(i_t)$ this means the shared secret $s = a(0)$ can be reconstructed as $$s = \sum_{i_j \in I} L_{i_j}^I(0) s_{i_j} \bmod p.$$

Which gives us the following algorithms for an $(n,t)$-Shamir secret sharing:

Share$(n,t,s) \to (s_1, \ldots, s_n)$: Given $s \in \mathbb{Z}_p$ set $a_0 := s$. Pick $a_1, \ldots, a_{t-1} \xleftarrow{\$} \mathbb{Z}_p$ and define $a(x) = \sum_{k=0}^{t-1} a_k x^k \bmod p$. Return $(s_1, \ldots, s_n) := (a(1), \ldots, a(n))$.

Reconstruct$(I, s_{i_1}, \ldots, s_{i_t})$: Given a set $I$ of distinct indices $1 \leq i_1 < \ldots < i_t \leq n$ and shares $s_{i_1}, \ldots, s_{i_t} \in \mathbb{Z}_p$ return $$s := \sum_{i_j \in I} L_{i_j}^I(0) s_{i_j} \bmod p.$$

Suppose now we want to convert an $(n,t)$-Shamir secret sharing of a secret $s$ into an $(n',t')$-Shamir secret sharing of the same secret $s$. In embodiments of our invention, a redistribution protocol gets input from $t$ dealers holding the original shares does this and outputs the new shares to $n'$ receivers. The idea is that dealer $i$ creates an $(n',t')$ secret sub-sharing of her secret share $s_i$. Then we give these $n'$ sub-shares to the receivers. The idea can be expressed in the following redistribution scheme:

Setup: Assume $s_1, \ldots, s_n$ is an $(n,t)$-secret sharing of $s \in \mathbb{Z}_p$.
Reshare$(n', t', s_i)$ : Return $(s_{i,1}, \ldots, s_{i,n'}) \leftarrow$ Share$(n', t', s_i)$.
Combine$(I, s_{i_1,j}, \ldots, s_{i_t,j})$: Return $s'_j \leftarrow$ Reconstruct$(I, s_{i_1,j}, \ldots, s_{i_t,j})$.

The important property is for all $1 \leq t' \leq n'$ and index sets $I$ of size $t$ and $J$ of size $t'$ we have $$\Pr\begin{bmatrix} \text{for } i \in I : (s_{i,j_1}, \ldots, s_{i,j_{t'}}) \leftarrow \mathsf{Reshare}(n', t', s_i) \\ \text{for } j \in J : s'_j \leftarrow \mathsf{Combine}(I, s_{i_1,j}, \ldots, s_{i_t,j}) \\ s' \leftarrow \mathsf{Reconstruct}(J, s'_{j_1}, \ldots, s'_{j_{t'}}) \end{bmatrix} : s' = s \end{bmatrix} = 1.$$

A key observation to see this is true is that Lagrange interpolation is linear. The original secret shares can be recombined using Lagrange interpolation to reconstruct the secret. But applying the same reconstruction procedure to the sub-shares also yields a secret sharing of the same secret. The receivers, provided they know the indices of the dealers, can therefore locally reconstruct $(n', t')$-shares of their new shares using Lagrange interpolation. To see this, we calculate:

$$s' = \sum_{j_\ell \in J} L^J_{j_\ell}(0) s'_{j_\ell} = \sum_{j_\ell \in J} L^J_{j_\ell}(0) \left( \sum_{i_k \in I} L^I_{i_k}(0) s_{i_k, j_\ell} \right)$$

$$= \sum_{i_k \in I} L^I_{i_k}(0) \left( \sum_{j_\ell \in J} L^J_{j_\ell}(0) s_{i_k, j_\ell} \right) = \sum_{i_k \in I} L^I_{i_k}(0) s_{i_k} = s$$

There are redistribution schemes that work for special cases, for instance if the set of dealers is the same as the set of receivers, the can instead jointly create a secret sharing of 0 and add it to their existing shares, to get a fresh $(n, t)$-secret sharing. Or they can increase the threshold by adding an $(n, t+1)$-secret sharing of 0 to their shares. A redistribution scheme according to embodiments is general and may handle all cases, but can be extended to incorporate existing special case handling for greater efficiency.

Secret sharing poses a problem for the receiver: did she get a correct share? The dealer may give her a bad share. The dealer may even distribute 'shares' that do not correspond to a real dealing. Feldman (Paul Feldman: A Practical Scheme for Non-interactive Verifiable Secret Sharing. FOCS 1987: 427-437) proposed verifiable secret sharing to deal with this problem. His scheme uses a group $\mathbb{G}$ of order $p$. The dealers distributes shares together with public group elements $A_0 = g^{a_0}, \ldots, A_{t-1} = g^{a_{t-1}}$. Receiver $i$ is supposed to get share $s_i = a(i)$, which can now be checked since if the secret sharing is correct we should have $$g^{s_i} = \prod_{k=0}^{t-1} A_k^{i^k} = g^{\sum_{k=0}^{t-1} a_k i^k} = g^{a(i)}.$$

Most verifiable secret sharing schemes use related ideas. They then let the receiver issue a complaint in case her share is wrong. Having a complaint phase means there is interaction with the receivers. The key redistribution protocol according to embodiments avoids interaction with the receivers and there is no interaction with dealers either.

1.5 Bulletin board - authenticated broadcast

According to embodiments, nodes communicate over a bulletin board. Here we define the properties of a bulletin board also known as an authenticated ordered broadcast channel. We have a set of dealers and a set of receivers. Each dealer constructs a message and broadcasts it (perhaps seeing a delay before it is broadcast). Each receiver may read the transcript of all broadcast messages in the order they were posted on the bulletin board (perhaps lagging a bit behind) and from those extract her resulting secret shares.

1.6 Signatures

One application of key redistribution is the redistribution of shares of a public verification key in a digital signature scheme. For completeness, we recap that a signature scheme (KGen, Sign, SigVfy) is perfectly correct if for all $m \in \{0,1\}^*$ we have $$\Pr[(vk, sk) \leftarrow \mathsf{KGen}; \sigma \leftarrow \mathsf{Sign}(sk, m) : \mathsf{SigVfy}(vk, m, \sigma) = \top] = 1.$$

For security purposes, one usually wants a signature scheme to be existentially unforgeable against adaptive chosen message attack.

BLS signatures. As a concrete example of a signature scheme, BLS signatures (Dan Boneh, Ben Lynn, Hovav Shacham: Short Signatures from the Weil Pairing. J. Cryptol. 17(4): 297-319 (2004)) work as follows:

Setup: We assume parameters available to the participants include groups $\mathbb{G}_1, \mathbb{G}_2, \mathbb{G}_T$ of known prime order $p$, generator $g_2$ of $\mathbb{G}_2$, and a pairing $e : \mathbb{G}_1 \times \mathbb{G}_2 \to \mathbb{G}_T$.
They also include a hash function $H_{\mathbb{G}_1} : \{0,1\}^* \to \mathbb{G}_1$.
KGen: Sample $sk \leftarrow \mathbb{Z}_q$, set $vk := g_2^{sk}$, and return $(vk, sk)$
Sign$(sk, m)$: Return $\sigma \leftarrow H_{\mathbb{G}_1}(m)^{sk}$
SigVfy$(sk, m, \sigma)$: Check whether $vk \in \mathbb{G}_2, \sigma \in \mathbb{G}_1$ and $e(H_{\mathbb{G}_1}(m), vk) = e(\sigma, g_2)$.
If all checks pass return $\top$, else return $\bot$.

It is easy to see the BLS signature scheme is perfectly correct. BLS signatures are also unique.

Uniqueness. A signature scheme is said to have unique signatures if there is at most one valid signature on a given message satisfying the verification algorithm. For all $vk, m, \sigma_1, \sigma_2$ with $\mathsf{SigVfy}(vk, m, \sigma_1) = \top$ and $\mathsf{SigVfy}(vk, m, \sigma_2) = \top$ it must be the case that $\sigma_1 = \sigma_2$.

1.7 Threshold signatures

According to embodiments, the invention may be used to redistribute shares of the secret key in a digital signature scheme. A threshold signature scheme enables a threshold of $t$ signers out of $n$ potential contributors to come together and produce signature shares for a message $m$. Given $t$ signature shares, they can be combined to a digital signature on the message. We define the syntax of threshold signatures by describing the constituent efficient algorithms below. The threshold signature scheme takes parameters and keys as inputs. We will later describe distributed key generation protocols for generating parameters and keys, but here they are just taken for granted.

VKVfy($t, vk, shvk_1, \ldots, shvk_n$) → $b$: Deterministic algorithm that on a setup with threshold $t$, a verification key $vk$, and share verification keys $shvk_1, \ldots, shvk_n$ returns ⊤ if the setup is considered valid, and else returns ⊥. It can only return ⊤ if $t, n$ are positive integers with $t \leq n$.

SKVfy($sk, shvk$) → ⊥: Deterministic algorithm that on a share-signing key $sk$ returns ⊤ if $sk$ is considered a valid share-signing key with respect to share-verification key $shvk$, and else returns ⊥.

SigShare($sk, m$) → $sh$: Deterministic or randomized algorithm that given a share-signing key $sk$ and a message $m \in \{0, 1\}^*$ produces a signature share $sh$.

SigShVfy($shvk, m, sh$) → $b$: Deterministic algorithm that given a share-verification key $vk_j$, a message $m$ and a signature share $sh$ returns ⊤ if the signature share is to be considered valid, and else returns ⊥.

SigShCombine($I, sh_1, \ldots, sh_t$) → $\sigma$: Deterministic algorithm that takes a set $I$ of distinct indices $i_1 < \ldots < i_t$ and $t$ signature shares $sh_1, \ldots, sh_t$ and combines them to a signature $\sigma$.

SigVfy($vk, m, \sigma$) → $b$: Deterministic algorithm that given a verification key $vk$, a message $m \in \{0, 1\}^*$ and a signature $\sigma$ returns ⊤ if the signature is to be considered valid, and else returns ⊥.

Correctness. The threshold signature scheme is perfectly correct if:

- VKVfy($t, vk, shvk_1, \ldots, shvk_n$) = ⊥ if $t \notin \{1, \ldots, n\}$
- Valid share-signing keys produce valid signature shares. For all $sk, shvk, m$ where SKVfy($sk, shvk$) = ⊤

$$\Pr[sh \leftarrow \text{SigShare}(sk, m) : \text{SigShVfy}(shvk, m, sh) = \top] = 1.$$

- Combining valid shares for a threshold of distinct indices yields a valid signature. For all $vk, shvk_1, \ldots, shvk_n, I, sh_{i_1}, \ldots, sh_{i_t}, m$ where VKVfy($t, vk, shvk_1, \ldots, shvk_n$) = ⊤, $I$ is a set of $t$ distinct indices $i_1 < \ldots < i_t \leq n$ and SigShVfy($shvk_i, m, sh_i$) = ⊤, for all $i \in I$ $$\Pr[\sigma \leftarrow \text{SigShCombine}(I, sh_{i_1}, \ldots, sh_{i_t}) : \text{SigVfy}(vk, m, \sigma) = \top] = 1.$$

Uniqueness. The unique signature property can be defined as for standard signatures schemes as it only depends on SigVfy.

BLS threshold signatures. According to embodiments, the invention may be used to redistribute shares of the secret key in BLS signatures and associated key material in BLS signatures. We now describe BLS threshold signatures (Alexandra Boldyreva: Threshold Signatures, Multisignatures and Blind Signatures Based on the Gap-Diffie-Hellman-Group Signature Scheme. Public Key Cryptography 2003: 31-46). We reuse the signature verification algorithm from standard BLS signatures but enable a situation where the secret key is secret shared into multiple secret share-signing keys. These share-signing keys can produce signature shares, and given enough signature shares they can be combined to a signature. The following algorithms can therefore be seen as a replacement of the signing algorithm, while we do not describe key generation here.

Setup: The parameters available to participants include groups $\mathbb{G}_1, \mathbb{G}_2, \mathbb{G}_T$ of known prime order $p$ with a pairing $e : \mathbb{G}_1 \times \mathbb{G}_2 \to \mathbb{G}_T$ and generators $g_1, g_2$ for $\mathbb{G}_1, \mathbb{G}_2$. The parameters also include a hash function $H_{\mathbb{G}_1} : \{0,1\}^* \to \mathbb{G}_1$.

VKVfy($t, vk, shvk_1, \ldots, shvk_n$): Check $t \in [1..n]$ and $vk, shvk_1, \ldots, shvk_n \in \mathbb{G}_2$. Set $shvk_0 := vk$ and $I = \{0, \ldots, t-1\}$. For $j = t, \ldots, n$ check whether $$shvk_j = \prod_{i \in I} vk_i^{L_i^I(j)}.$$

Return $\top$ if all checks pass, else return $\bot$.

SKVfy($sk, shvk$) : If $sk \in \mathbb{Z}_p$ and $shvk = g_2^{sk}$ return $\top$, else return $\bot$.

SigShare($sk, m$) : Return $$sh := H_{\mathbb{G}_1}(m)^{sk}.$$

SigShVfy($shvk, m, sh$) : Check $shvk \in \mathbb{G}_2$ and $sh \in \mathbb{G}_1$. Check whether $e(H_{\mathbb{G}_1}(m), shvk) = e(sh, g_2)$. Return $\top$ if all checks pass, else return $\bot$.

SigShCombine($I, shvk_{i_1}, \ldots, sh_{i_t}$): Parse $I$ as a set of distinct indices $i_1 < \ldots < i_t$ and $sh_{i_1}, \ldots, sh_{i_t}$ as elements in $\mathbb{G}_1$. Return $$\sigma := \prod_{i \in I} sh_i^{L_i^I(0)}.$$

SigVfy($vk, m, \sigma$): Check whether $vk \in \mathbb{G}_2$, $\sigma \in \mathbb{G}_1$ and $$e(H_{\mathbb{G}_1}(m), vk) = e(\sigma, g_2).$$

If all checks pass return $\top$, else return $\bot$.

Here the secret key is the discrete logarithm of $vk$ and the shares of the threshold signers are the discrete logarithms of $shvk_i$. The group elements $vk$ and $shvk_1, \ldots, shvk_n$ are associated public key material. In SKVfy, $sk$ is a secret share of the secret key and $shvk$ matching associated key material for the secret share.

1.8 Concrete parameter choices

According to embodiments, there are many ways we can choose parameters of our protocol for non-interactive key redistribution. One possibility for the reader who wants to consider concrete values when reading the following sections is:

- Security parameter $\lambda = 256$
- BLS12-381 has $p \approx 2^{255}$
- Number of share holders $n = 28$
- Threshold $t = 10$
- Honest chunk size $B = 2^{16}$
- Number of chunks we split a field element into $m = 16$ satisfying $B^m > p$
- Number of challenges in chunk proofs $\ell = 16$
- Challenge space in chunk proofs $E = 2^{\lceil \lambda/\ell \rceil} = 2^{16}$
- Combined input size in chunk proofs $S = nm(E-1)(B-1) \approx 2^{41}$
- Total range in chunk proofs $Z = 2\ell S = 2^{46}$

2 Public-key encryption schemes

According to embodiments we use a novel CCA-secure multi-receiver public-key encryption scheme with forward secrecy. Here we explain step by step the construction of such an encryption scheme.

One object is to present a distributed key generation and key redistribution protocol to maintain individual nodes' threshold shares of the signing key. In an embodied protocol, nodes will need long-term public encryption keys since we want to minimize interaction and we encrypt shares to individual nodes. Other participants can throughout the node's life use this public key to encrypt messages to the node.

In the key redistribution protocol, the node will receive multiple messages. The protocol is resilient towards attack, we assume some of the messages maybe maliciously generated. It is therefore prudent to aim for security againstchosen ciphertext attack. Moreover, since the key is in long-term use there isa risk that the node will be compromised and the decryption key be revealed. Embodiments take defensive action by using an encryption scheme with forward secrecy. Forward secrecy means dividing time into epochs and encrypting messages to aspecific epoch. The node correspondingly updates its decryption key to matchthe current epoch and deletes decryption keys for old epochs. This way, even ifthe node is compromised, it cannot decrypt an old ciphertext for a past epochso we reduce the information the adversary may learn.

Embodiments encrypt threshold shares of the signing key to multiple shareholders. Accordingly a multi-receiver encryption scheme that allows us to encrypt multiple messages to a group of receivers in one ciphertext is advantageous. In this section, we build step by step a novel multi-receiverpublic-key encryption schemethat is indistinguishable under chosen ciphertextattack and has forward secrecy.

2.1 Binary tree encryption

According to embodiments, we can use binary tree encryption. In BTE the parameters specify a binary tree of height $\lambda$.[2] The encryption algorithm takes a plaintext and encrypts it to a leaf in the tree. To each leaf may be associated a decryption key, and a holder of that decryption key can recover the plaintext. There are also decryption keys associated with internal nodes. A decryption key for an internal node lets you derive a decryption key for any children of that node. This means, if you have the decryption key for the root you can derive decryption keys for all leaves. But if you do not have the decryption key for the root, you can only decrypt ciphertexts pertaining to leaves in the subtrees of the decryption keys you hold.[3]

A BTE scheme has the following efficient algorithms:

Setup: The parameters specify a message space $\mathcal{M}$ and and height $\lambda$ for a binary tree. We will write a path to a node in the tree as $\tau_1 \ldots \tau_\ell$ with $\ell \leq \lambda$ and for a leaf $\ell = \lambda$ KGen $\to (pk, dk)$: Randomized key generation algorithm that produces a public key and a decryption key for the root of the tree KVfy$(pk) \to b$: Deterministic key verification algorithm that returns $\top$ if the public key is considered valid, and otherwise returns $\bot$ Derive$(dk_{\tau_1 \ldots \tau_{\ell-1}}, \tau_\ell) \to dk_{\tau_1, \ldots, \tau_\ell}$: Randomized update algorithm that given a decryption key for the node $\tau_1 \ldots \tau_{\ell-1}$ and a bit $\tau_\ell$ returns a decryption key for the node $\tau_1 \ldots \tau_\ell$. If $\ell > \lambda$ or $\tau_\ell \notin \{0, 1\}$ or something else goes wrong the derivation algorithm returns $\bot$.

We will throughout the paper use the convention that $dk$ is a decryption key and $dk_{\tau_1, \ldots, \tau_\ell}$ is a pair $(\tau_1, \ldots, \tau_\ell, dk)$ that explicitly indicates the decryption key's intended node $\tau_1 \ldots \tau_\ell$ Enc$(pk, m, \tau_1, \ldots, \tau_\lambda) \to c$: Randomized encryption algorithm that given a public key, message and a leaf returns a ciphertext (or $\bot$ in case of failure, e.g., if one of the inputs is malformed)

Dec$(dk_{\tau_1, \ldots, \tau_\lambda}, c) \to m$: Deterministic decryption algorithm that given a ciphertext and decryption key for a leaf returns a plaintext $m \in \mathcal{M}$ or $\bot$ in case of error.

Construction.

Setup: The parameters specify a message space $\mathcal{M} = [-R..S] \subset \mathbb{Z}_p$ that is small enough to be searched by brute force, group elements $f_0, f_1, \ldots, f_\lambda, h \in \mathbb{G}_2$ and a tree height $\lambda$.

KGen $\to (y, dk)$: Pick $x \xleftarrow{\$} \mathbb{Z}_p$ and compute $y := g_1^x$. Pick $\rho \xleftarrow{\$} \mathbb{Z}_p$ and let $dk := (g_1^\rho, g_2^x f_0^\rho, f_1^\rho, \ldots, f_\lambda^\rho, h^\rho)$. Return $(y, dk)$.

---

[2] Larger branching factors are possible and give a modest performance improvement at the cost of greater complexity in defining and describing BTE.

[3] Binary tree encryption [CHK07] is related to hierarchical identity-based encryption but in HIBE identities can be arbitrary strings, while here we have a very small "identity" space.

KVfy($pk$) → $b$: If $pk = y \in \mathbb{G}_1$ return ⊤ else return ⊥

Derive($dk_{\tau_1\ldots\tau_{\ell-1}}, \tau_\ell$) → $dk_{\tau_1\ldots\tau_\ell}$: Given $$dk_{\tau_1\ldots\tau_{\ell-1}} = (\tau_1\ldots\tau_{\ell-1}, a, b, d_\ell, \ldots, d_\lambda, e) \in \{0,1\}^{\ell-1} \times \mathbb{G}_1 \times \mathbb{G}_2^{\lambda-\ell+2}$$

and $\tau_\ell \in \{0,1\}$ pick $\delta \xleftarrow{\$} \mathbb{Z}_p$ and return $$dk_{\tau_1\ldots\tau_\ell} := (\tau_1\ldots\tau_\ell, a \cdot g_1^\delta, b \cdot d_\ell^{\tau_\ell} \cdot (f_0 \prod_{i=1}^{\ell} f_i^{\tau_i})^\delta, d_{\ell+1} \cdot f_{\ell+1}^\delta, \ldots, d_\lambda \cdot f_\lambda^\delta, e \cdot h^\delta).$$

Enc($y, m, \tau_1\ldots\tau_\lambda$) → $c$: Given $y \in \mathbb{G}_1, m \in \mathcal{M}, \tau_1\ldots\tau_\lambda \in \{0,1\}^\lambda$ pick $r, s \leftarrow \mathbb{Z}_p$ and return $$c := \left(y^r g_1^m, g_1^r, g_1^s, \left(f_0 \prod_{i=1}^{\lambda} f_i^{\tau_i}\right)^r, h^s\right)$$

Dec($dk_{\tau_1\ldots\tau_\lambda}, c$) → $m$: Parse $$dk_{\tau_1\ldots\tau_\lambda} = (\tau_1\ldots\tau_\lambda, a, b, e) \in \{0,1\}^\lambda \times \mathbb{G}_1 \times \mathbb{G}_2^2$$

and $c = (C, R, S, Z) \in \mathbb{G}_1^3 \times \mathbb{G}_2$. Assert $e\left(R, f_0 \prod_{i=1}^{\lambda} f_i^{\tau_i}\right) \cdot e(S, h) = e(g_1, Z)$. Compute $$M := e(C, g_2) \cdot e(R, b)^{-1} \cdot e(a, Z) \cdot e(S, e)^{-1}.$$

Search for $m \in \mathcal{M}$ such that $M = e(g_1, g_2)^m$. If everything succeeds return $m$, else return ⊥.

2.2 Multi-receiver binary tree-encryption

According to embodiments, in a multi-receiver BTE scheme the sender has multiple plaintexts to address to different receivers. Reuse of randomness in a multi-receiver encryption scheme makes it more efficient than parallel repetition of a single-receiver encryption scheme. Multi-receiver BTE has the following efficient algorithms:

Setup: The parameters specify a message space $\mathcal{M}$ and a height $\lambda$ for a tree with $2^\lambda$ leaves. We will write a path to a node in the tree as $\tau_1\ldots\tau_\ell$ with $\ell \leq \lambda$ and for a leaf $\ell = \lambda$ KGen → ($pk, dk$): Randomized key generation algorithm that produces a public key and a decryption key for the root KVfy($pk$) → $b$: Deterministic key verification algorithm that returns ⊤ if the public key is considered valid, and otherwise returns ⊥

Derive($dk_{\tau_1\ldots\tau_{\ell-1}}, \tau_\ell$) → $dk_{\tau_1\ldots\tau_\ell}$): Randomized update algorithm that given a decryption key for the node $\tau_1\ldots\tau_{\ell-1}$ returns a decryption key for the node $\tau_1\ldots\tau_\ell\tau_\ell$.

Enc($pk_1, m_1, \ldots, pk_n, m_n, \tau_1\ldots\tau_\lambda$) → $c$: Randomized encryption algorithm that given public keys and messages addressed to their owners and a leaf returns a ciphertext (or ⊥ in case of failure, e.g., if one of the inputs is malformed)

Dec($i, dk_{\tau_1\ldots\tau_\lambda}, c$) → $m$: Deterministic decryption algorithm that given a ciphertext, an index to decrypt and a decryption key for a leaf returns a plaintext $m \in \mathcal{M}$ or ⊥ in case of error.

Construction. We now give a construction of a novel multi-receiver BTE scheme used in embodiments. Our construction is almost the same as for a single receiver, except we use the same randomness $r, s$ to encrypt to multiple public keys. To prove the BTE to a group scheme is secure, we want to reduce it to the security of the single receiver BTE scheme. For the security proof to work, this means that from a single receiver ciphertext we need to simulate an extension to a multi-receiver ciphertext, and for this we need to know the discrete logarithm of the public key. We therefore add to each public key $y_i$ a proof of knowledge of the discrete logarithm.

Setup: The parameters specify a message space $\mathcal{M} = [-R..S] \subset \mathbb{Z}_p$ that is small enough to be searched by brute force, group elements $f_0, f_1, \ldots, f_\lambda, h \in \mathbb{G}_2$ and a tree height $\lambda$.
They parameters also provide a setup for a simulation-extractable NIZK proof of knowledge of a discrete logarithm (TBD: add details for the NIZK of dlog).

KGen $\to (pk, dk)$: Pick $x \xleftarrow{\$} \mathbb{Z}_p$ and compute $y := g_1^x$. Generate a proof of knowledge of the discrete logarithm $x$ as $\pi \leftarrow \mathsf{Prove}_{\mathsf{dlog}}(y; x)$ and set $pk := (y, \pi)$. Pick $\rho \xleftarrow{\$} \mathbb{Z}_p$ and let $dk := (g_1^\rho, g_2^x f_0^\rho, f_1^\rho, \ldots, f_\lambda^\rho, h^\rho)$. Return $(pk, dk)$.

KVfy$(pk) \to b$: Parse $pk = (y, \pi)$. If $y \in \mathbb{G}_1$ return $\mathsf{PVfy}_{\mathsf{dlog}}(y, \pi)$, else return $\perp$ Derive$(dk_{\tau_1 \ldots \tau_{\ell-1}}, \tau_\ell) \to dk_{\tau_1 \ldots \tau_\ell}$: Given $$dk_{\tau_1 \ldots \tau_{\ell-1}} = (\tau_1 \ldots \tau_{\ell-1}, a, b, d_\ell, \ldots, d_\lambda, e) \in \{0,1\}^{\ell-1} \times \mathbb{G}_1 \times \mathbb{G}_2^{\lambda-\ell+2}$$

and a bit $\tau_\ell$ pick $\delta \xleftarrow{\$} \mathbb{Z}_p$ and return $$dk_{\tau_1 \ldots \tau_\ell} := (\tau_1 \ldots \tau_\ell, a \cdot g_1^\delta, b \cdot d_\ell^{\tau_\ell} \cdot (f_0 \prod_{i=1}^\ell f_i^{\tau_i})^\delta, d_{\ell+1} \cdot f_{\ell+1}^\delta, \ldots, d_\lambda \cdot f_\lambda^\delta, e \cdot h^\delta).$$

Enc$(pk_1, m_1, \ldots, pk_n, m_n, \tau_1 \ldots \tau_\lambda) \to c$: Given inputs $pk_i = (y_i, \pi_i)$ with $y_i \in \mathbb{G}_1$ and $m_i \in \mathcal{M}$ and $\tau_1 \ldots \tau_\lambda \in \{0,1\}^\lambda$ pick $r, s \leftarrow \mathbb{Z}_p$ and return $$c := \left( y_1^r g_1^{m_1}, \ldots, y_n^r g_1^{m_n}, g_1^r, g_1^s, \left( f_0 \prod_{i=1}^\lambda f_i^{\tau_i} \right)^r, h^s \right)$$

Dec$(i, dk_{\tau_1 \ldots \tau_\lambda}, c) \to m$: Parse $$dk_{\tau_1 \ldots \tau_\lambda} = (\tau_1 \ldots \tau_\lambda, a, b, e) \in \{0,1\}^\lambda \times \mathbb{G}_1 \times \mathbb{G}_2^2$$

and $c = (C_1, \ldots, C_n, R, S, Z) \in \mathbb{G}_1^{n+2} \times \mathbb{G}_2$. Assert $e\left(R, f_0 \prod_{i=1}^\lambda f_i^{\tau_i}\right) \cdot e(S, h) = e(g_1, Z)$. Assuming $i \in [1..n]$ compute $$M := e(C_i, g_2) \cdot e(R, b)^{-1} \cdot e(a, Z) \cdot e(S, e)^{-1}.$$

Search for $m \in \mathcal{M}$ such that $M = e(g_1, g_2)^m$. If everything succeeds return $m$, else return $\perp$.

2.3 Multi-receiver tree-encryption with message space $\mathbb{Z}_p$

If $m \xleftarrow{\$} \mathbb{Z}_p$ it is infeasible to compute the discrete logarithm of $M = e(g_1, g_2)^m$ and decryption takes too long time. The natural solution is to use chunked encryption. Take $m$ and write it as $m = \sum_{j=1}^m m_j B^{j-1}$ with chunks $m_j \in [0..B-1]$ where the bound $B$ on the chunk size is small enough to make it possible to brute-force search through $[0..B-1]$ (in embodiments we use Small-step Giant-step to save on the cost).

Let us formally write down the details of the multi-receiver BTE scheme for message space $\mathbb{Z}_p$ building on a BTE to a group scheme for message space $[-R..S]$.

Setup: The parameters include the setup for the basic multi-receiver tree-encryption scheme and positive integers $B, m$ such that $[0..B-1] \subset [-R..S]$ and $p < B^m$.

KGen' $\to (pk, dk)$: Return $(pk, dk) \leftarrow$ KGen

KVfy'$(pk) \to b$: Return KVfy$(pk)$

Derive'$(dk_{\tau_1,\ldots,\tau_{\ell-1}}, \tau_\ell) \to dk'$: Return Derive$(dk_{\tau_1,\ldots,\tau_{\ell-1}}, \tau_\ell)$ Enc'$(pk_1, m_1, \ldots, pk_n, m_n, \tau_1, \ldots, \tau_\lambda) \to c'$: Given $m_1, \ldots, m_n \in \mathbb{Z}_p$ chunk them into pieces $m_{i,j} \in [0..B-1]$ so that $m_i = \sum_{j=1}^m m_{i,j} B^{j-1}$. For $j = 1, \ldots, m$ set $c_j \leftarrow$ Enc$(pk_1, m_{1,j}, \ldots, pk_n, m_{n,j}, \tau_1, \ldots, \tau_\lambda)$. Return $c' := (c_1, \ldots, c_m)$ Dec'$(i, dk_{\tau_1,\ldots,\tau_\lambda}, c') \to m'$: Parse $c' = (c_1, \ldots, c_m)$ and for $j = 1, \ldots, m$ compute $m_{i,j} \leftarrow$ Dec$(i, dk, \tau_1, \ldots, \tau_\lambda, c_j)$. If any $m_j = \bot$ return $\bot$, else return $m' := \sum_{j=1}^m m_{i,j} B^{j-1} \bmod p$ Let us write out the full encryption algorithm with some rearrangement of the group elements in order to observe that the encryption process and resulting ciphertext can be split in two parts. The first part depends on the plaintexts and the second part depends on the leaf (and both parts depend on the randomness). We also write out the decryption algorithm in order to observe that the second part of the ciphertext is unique given the first part and the leaf.

Enc$(pk_1, m_1, \ldots, pk_n, m_n, \tau_1 \ldots \tau_\lambda) \to c = (c_1, c_2)$: Pick $r_1, s_1, \ldots, r_m, s_m \leftarrow \mathbb{Z}_p$ and compute $c_1 :=$ Enc$_1(pk_1, m_1, \ldots, pk_n, m_n; r_1, s_1, \ldots, r_m, s_m)$ and $c_2 :=$ Enc$_2(\tau_1, \ldots, \tau_\lambda; r_1, s_1, \ldots, r_m, s_m)$ where

- Enc$_1(pk_1, m_1, \ldots, pk_n, m_n; r, s)$ first parses $pk_1, \ldots, pk_n$ as $pk_i = (y_i, \pi_i)$ with $y_i \in \mathbb{G}_1$ and chunks $m_1, \ldots, m_n \in \mathbb{Z}_p$ as $m_i = \sum_{j=1}^m m_{i,j} B^{j-1}$ using chunks $m_{i,j} \in [0..B-1]$.
  It returns $c_1 := (C_{1,1}, \ldots, C_{n,m}, R_1, \ldots, R_m, S_1, \ldots, S_m) \in \mathbb{G}_1^{n(m+2)}$, where
  $$C_{i,j} := y_i^{r_j} g_1^{m_{i,j}} \qquad R_j := g_1^{r_j} \qquad S_j := g_1^{s_j}.$$

- Enc$_2(\tau_1, \ldots, \tau_\lambda; r_1, s_1, \ldots, r_m, s_m)$ on $\tau_1, \ldots, \tau_\lambda \in \{0,1\}$ returns $c_2 := (Z_1, \ldots, Z_m) \in \mathbb{G}_2^m$, where
  $$Z_j := \left(f_0 \prod_{i=1}^\lambda f_i^{\tau_i}\right)^{r_j} h^{s_j}.$$

Return $c := (c_1, c_2)$ if everything worked. If $c_1 = \bot$ or $c_2 = \bot$, the encryption algorithm instead returns $c := \bot$.

Dec$(i, dk_{\tau_1\ldots\tau_\lambda}, c) \to m$: Parse $c = (c_1, c_2)$ and $c_1 = (C_{1,1}, \ldots, C_{n,m}, R_1, \ldots, R_m, S_1, \ldots, S_m) \in \mathbb{G}_1^{n(m+2)}$ and $c_2 = (Z_1, \ldots, Z_m)$. Check that for all $j = 1, \ldots, m$ we have $$e(g_1, Z_j) = e(R_j, f_0 \prod_{i=1}^{\lambda} f_i^{\tau_i}) \cdot e(S_j, h).$$

Assuming $1 \leq i \leq n$ parse $dk_{\tau_1,\ldots,\tau_\lambda} = (\tau_1 \ldots \tau_\lambda, a, b, e) \in \{0,1\}^\lambda \times \mathbb{G}_1 \times \mathbb{G}_2^2$ as in the tree-encryption to a group scheme for $\mathcal{M} = [-R..S]$. For $j = 1, \ldots, m$ compute $$M_j := e(C_{i,j}, g_2) \cdot e(R_j, b)^{-1} \cdot e(a, Z_j) \cdot e(S, h)^{-1}$$

and search for $m_j \in [-R..S]$ such that $M_j = e(g_1, g_2)^{m_j}$. If everything succeeds return $m := \sum_{j=1}^{m} m_j B^{j-1} \mod p$, else return $\bot$.

2.4 CCA-secure multi-receiver public-key encryption with forward secrecy

A multi-receiver encryption scheme with forward secrecy consists of the following efficient algorithms:

Setup: The parameters specify the message space $\mathcal{M}$ and a maximum number of epochs $T = 2^{\lambda_T}$ KGen $\to (pk, dk_0)$: Randomized key generation algorithm that produces a public key and a decryption key for epoch $\tau = 0$ KVfy$(pk) \to b$: Deterministic key verification algorithm that returns $\top$ if the public key is considered valid, and otherwise returns $\bot$ KUpd$(dk_\tau) \to dk_{\tau+1}$: Randomized update algorithm that given a decryption key for epoch $\tau$ returns a decryption key for $\tau + 1$. If $\tau + 1 = T$ it returns $\bot$
We will throughout the paper assume $dk_\tau$ implicitly defines the epoch $\tau$ it is intended for.

Enc$(pk_1, m_1, \ldots, pk_n, m_n, \tau) \to c$: Randomized encryption algorithm that given $n$ public keys and messages together with an epoch returns a ciphertext (or $\bot$ in case of failure, e.g., if one of the inputs is malformed).

Dec$(i, dk_{\tau'}, c, \tau) \to m$: Deterministic decryption algorithm that given a decryption key $dk_\tau$ for index $i$ and a ciphertext for epoch $\tau$ returns a plaintext $m \in \mathcal{M}$ or $\bot$ in case of error. It always returns $\bot$ in case $\tau \notin [\tau'..T-1]$.

Construction. According to embodiments, we can use a novel CCA-secure multi-receiver encryption scheme with forwards secrecy. It builds on the multi-receiver tree-encryption scheme for $\mathbb{Z}_p$ and we use the notation based on the fact that the BTE encryption algorithm can be split into two parts, one that is independent of the leaf and one that is independent of the plaintexts.

Setup: The parameters specify the message space $\mathbb{Z}_p$ and a maximum number of epoch $T = 2^{\lambda_T}$ and a hash function $H : \{0,1\}^* \to \{0,1\}^{\lambda_H}$.
The setup includes group elements $f_0, \ldots, f_\lambda, h \in \mathbb{G}_2$ for the tree-encryption to a group scheme defined in the previous section, where $\lambda = \lambda_T + \lambda_H$.

KGen $\to (pk, dk_0)$: Pick $x \leftarrow \mathbb{Z}_p$ and compute $y := g_1^x$. Generate $\pi \leftarrow \mathsf{Prove}_{\mathsf{dlog}}(y, x)$ and let $pk := (y, \pi)$. Pick $\rho \leftarrow \mathbb{Z}_p$ and set $dk := (g_2^\rho, g_2^x f_0^\rho, f_1^\rho, \ldots, f_\lambda^\rho, h^\rho)$. Let $dk_0 := (0, \{dk\})$ and return $(pk, dk_0)$.

KVfy$(pk) \to b$: Parse $pk = (y, \pi)$ and if $y \in \mathbb{G}_1$ return $\mathsf{PVfy}_{\mathsf{dlog}}(y, \pi)$, else return $\bot$ KUpd$(dk_\tau, \tau) \to dk_{\tau+1}$: Parse $\tau = \tau_1 \ldots, \tau_{\lambda_T}$ in binary and $dk_\tau = (\tau, \{dk_{\tau_1 \ldots \tau_\ell}\}_{\tau_1 \ldots \tau_\ell \in \mathcal{T}_\tau})$, where $\mathcal{T}_\tau$ is a minimal set of nodes such that their subtrees cover exactly the leaves in $[\tau..T - 1]$ ($\mathcal{T}_\tau$ has at most $\lambda_T$ nodes). Let $\mathcal{T}_{\tau+1}$ be the minimal set of nodes whose subtrees cover the leaves $[\tau + 1..T - 1]$ and for all new $\tau_1 \ldots \tau_\ell \in \mathcal{T}_{\tau+1} \setminus \mathcal{T}_\tau$ derive a subkey $dk_{\tau_1 \ldots \tau_\ell}$. Return $$dk_{\tau+1} = \left(\tau + 1, \{dk_{\tau_1 \ldots \tau_\ell}\}_{\tau_1 \ldots \tau_\ell \in \mathcal{T}_{\tau'}}\right)$$

Enc$(pk_1, m_1, \ldots, pk_n, m_n, \tau) \to c$: Parse $\tau = \tau_1 \ldots \tau_{\lambda_T}$ in binary. Pick $r_1, s_1, \ldots, r_m, s_m \leftarrow \mathbb{Z}_p$ and compute $$c_1 := \mathsf{Enc}_1(pk_1, m_1, \ldots, pk_n, m_n; r_1, s_1, \ldots, r_m, s_m).$$

Compute $\tau_{\lambda_T+1} \ldots \tau_\lambda := H(c_1, \tau)$ and $$c_2 := \mathsf{Enc}_2(\tau_1, \ldots, \tau_\lambda; r_1, s_1, \ldots, r_m, s_m).$$

If everything succeeds return $c := (c_1, c_2)$, else return $\bot$.

Dec$(i, dk_{\tau'}, c, \tau) \to m$: Parse $c = (c_1, c_2)$ and $\tau = \tau_1 \ldots \tau_{\lambda_T}$. Compute $\tau_{\lambda_T+1} \ldots \tau_\lambda := H(c_1, \tau)$. Assuming $\tau \in [\tau'..T-1]$ derive $dk_{\tau_1 \ldots \tau_\lambda}$ and return Dec$(i, dk_{\tau_1 \ldots \tau_\lambda}, c)$. If anything fails return $\bot$.

3 Non-interactive zero-knowledge proofs

3.1 NIZK proofs - background

We define a non-interactive zero-knowledge proof for an efficiently decidable binary relation $\mathcal{R}$ (which may depend on system-wide parameters) through three efficient algorithms. We use the Fiat-Shamir heuristic to create NIZK proofs, which means the prover uses a hash/extendable output function to create challenges in the proof.

Prove$^H$(instance, witness) $\to \pi$: Randomized algorithm that on an instance and a witness returns a proof $\pi$ (or error symbol $\bot$)

PVfy$^H$(instance, $\pi$) $\to b$: Deterministic algorithm that on an instance and a proof $\pi$ returns $\top$ if the proof is to be considered valid, and otherwise returns $\bot$. If the verification algorithm gets $\bot$ as input, whether in the instance, the proof, or from the oracle, it returns $\bot$.

NIZK proofs satisfy standard correctness and security notions such as completeness, soundness, zero knowledge; and depending on the situation stronger notions such as simulation soundness and simulation extractability.

3.2 Proof of discrete logarithm

In embodiments we use several NIZK proofs, one of which is a standard Schnorr proof for knowledge of a discrete logarithm.

NIZK proof for knowledge of a discrete logarithm

Setup: Group $\mathbb{G}_1$ of known prime order $p$ with generator $g_1$. A hash function $H : \{0,1\}^* \to \mathbb{Z}_p$.
Instance: $y \in \mathbb{G}_1$
Statement: Knowledge of the unique discrete logarithm of $y$
Witness: $x \in \mathbb{Z}_p$ such that $y = g_1^x$
Prove$^H$(instance, witness):
- Pick $r \xleftarrow{\$} \mathbb{Z}_p$ and compute $a := g_1^r$
- Compute $e := H(y, a)$
- Compute $z := ex + r \bmod p$
- Let the proof be $\pi = (a, z) \in \mathbb{G}_1 \times \mathbb{Z}_p$
- Return $\pi$ (and delete intermediate information created during proof)

PVfy$^H$(instance, $\pi$):
- Check that the instance and proof are correctly formatted with group elements $y, a \in \mathbb{G}_1$ and field element $z \in \mathbb{Z}_p$ as expected
- Compute $e := H(y, a)$
- Return $\top$ if all checks pass and $$y^e a = g_1^z,$$

else reject by returning $\bot$

3.3 Proof of correct secret sharing

According to embodiments, we use a novel NIZK proof of a correct secret sharing. From a dealing (defined in the last section) anybody can compute combined group elements $$R = \prod_{i=1}^{m} R_i^{B^{j-1}}, \quad C_1 = \prod_{i=1}^{m} C_{1,j}^{B^{j-1}}, \ldots, \quad C_n = \prod_{j=1}^{m} C_{n,j}^{B^{j-1}}.$$

These group elements uniquely define $r \in \mathbb{Z}_p$ and $s_1, \ldots, s_n \in \mathbb{Z}_p$ such that $R = g_1^r, C_i = y_i^r \cdot g_1^{s_i}$. The starting group elements from the dealing $R_j, C_{i,j}$ can also be written uniquely in terms of discrete logarithms $R_j = g_1^{r_j}$ and $C_{i,j} = y_i^{r_j} g_1^{s_{i,j}}$, giving us the relationship $r = \sum_{j=1}^{m} r_j B^{j-1}$ and $s_i = \sum_{j=1}^{m} s_{i,j} B^{j-1}$.

In a correct dealing, each $s_i = a(i) = \sum_{k=0}^{t-1} a_k i^k$. We now present an NIZK proof for the statement that this equality holds for each $i = 1, \ldots, n$. The idea is to use the hash function to compute a challenge $x \in \mathbb{Z}_p$, which we use to compress the instance to $$C := \prod_{i=1}^{n} C_i^{x^i} = \prod_{i=1}^{n} y_i^{x^i} \cdot g_1^{\sum_{i=1}^{n} s_i x^i}.$$

If the statement is true, we have $$\sum_{i=1}^{n} s_i x^i = \sum_{i=1}^{n} \left( \sum_{k=0}^{t-1} a_k i^k \right) x^i = \sum_{k=0}^{t-1} a_k \left( \sum_{i=1}^{n} i^k x^i \right)$$

and if the statement is false, i.e., there is any $s_i \neq a(i)$, then there are at most $n$ possible values of $x$ where the equality accidentally holds. After the compression step we can therefore do a new Schnorr-style proof with a second random oracle challenge $x'$ that the compressed $s = \sum_{i=1}^{n} s_i x^i$ is identical to the discrete logarithm of $\prod_{i=1}^{n} \left( \prod_{k=0}^{t-1} A_k^{i^k} \right)^{x^i}$.

NIZK proof for correct secret sharing

Setup: Groups $\mathbb{G}_1, \mathbb{G}_2, \mathbb{G}_T$ of known prime order $p$ with a pairing $e : \mathbb{G}_1 \times \mathbb{G}_2 \to \mathbb{G}_T$ and with generators $g_1, g_2, e(g_1, g_2)$. Group element $h \in \mathbb{G}_2 \setminus \{1\}$. A hash function $H : \{0,1\}^* \to \mathbb{Z}_p$.

Instance: $y_1, \ldots, y_n \in \mathbb{G}_1$, $A_0 = g_2^{a_0}, \ldots, A_{t-1} = g_2^{a_{t-1}}$ and[4]

$$R = g_1^r \quad, \quad C_1 = y_1^r \cdot g_1^{s_1}, \quad \ldots, \quad C_n = y_n^r \cdot g_1^{s_n}$$

Statement: The discrete logarithms in the instance satisfy for $i = 1, \ldots, n$ $$s_i = \sum_{k=0}^{t-1} a_k i^k \mod p$$

Witness: $r, s_1, \ldots, s_n \in \mathbb{Z}_p$ satisfying $s_i = a(i)$, where $a(i) = \sum_{k=0}^{t-1} a_k i^k \mod p$ Prove$^H$(instance, witness):
- Compute $x := H(\text{instance})$
- Generate random $\alpha, \rho \xleftarrow{\$} \mathbb{Z}_p$ and compute $$F = g_1^\rho \quad, \quad , \quad A = g_2^\alpha \quad, \quad Y = \left( \prod_{i=1}^{n} y_i^{x^i} \right)^\rho \cdot g_1^\alpha$$

- Compute $x' := H(x, F, A, Y)$
- Compute $$z_r = rx' + \rho \mod p \quad , \quad z_a = x' \sum_{i=1}^{n} s_i x^i + \alpha \mod p$$

- Let the proof be $\pi = (F, A, Y, z_r, z_a) \in \mathbb{G}_1 \times \mathbb{G}_2 \times \mathbb{G}_1 \times \mathbb{Z}_p^2$
- Return $\pi$ (and delete intermediate information created during proof)

---

[4] The instance just specifies the $2n + t$ group elements, the exponents are not part of the instance but uniquely defined by the group elements and indicated for later reference.

PVfy$^H$(instance, $\pi$):
- Check that the instance and proof are correctly formatted with group elements $y_1,\ldots,y_n, R, C_1,\ldots,C_n, F, Y \in \mathbb{G}_1$, $A_0,\ldots,A_{t-1}, A \in \mathbb{G}_2$ and field elements $z_r, z_a \in \mathbb{Z}_p$ as expected
- Compute $x := H(\text{instance})$ and $x' := H(x, F, A, Y)$
- Verify $$R^{x'} \cdot F = g_1^{z_r} \quad , \quad \left(\prod_{k=0}^{t-1} A_k^{\sum_{i=1}^{n} i^k x^i}\right)^{x'} \cdot A = g_2^{z_a}$$

and $$\left(\prod_{i=1}^{n} C_i^{x^i}\right)^{x'} \cdot Y = \left(y_i^{x^i}\right)^{z_r} \cdot g_1^{z_a}$$

- Return T if all checks pass, else reject by returning $\bot$

According to embodiments, dealers act as provers in the NIZK proof for correct secret sharing. The elements $a_0,\ldots,a_{t-1}$ are coefficients of a polynomial $a(i)$ defining a Shamir secret sharing chosen by the dealer. The dealer's secret share to be reshared is $s = a(0)$ and $s_1 = a(1),\ldots,s_n = a(n)$ are secret sub-shares. The dealer provides associated key material $A_0,\ldots,A_{t-1}$ that is related to the secret sharing by $A_0 = g_2^{a_0},\ldots,A_{t-1} = g_2^{a_{t-1}}$.

3.4 Proof of correct chunking

According to embodiments, we use a novel NIZK proof for correct chunkingin a ciphertext. A dealer must provide evidence that it is possible to decrypt ciphertexts in a dealing so the receivers can recover their shares of the signing key. The ciphertexts we use in the dealings are for the most part publicly verifiable, the only problem is that plaintexts are supposed to be chunked into small pieces and to extract the chunks the receiver needs to compute discrete logarithms. A receiver would therefore have a problem if the chunks it is supposed to extract are too large. Hence embodiments provide an NIZK proof system that can ensure all chunks are of modest size.

We start by observing that we need not consider the full ciphertexts, only parts of them are critical for demonstrating that the encrypted chunks have correct size. Each receiver $i$ sees a set of ElGamal ciphertexts $(R_1, C_{i,1}),\ldots,(R_m, C_{i,m})$ purportedly containing $m$ chunks of her plaintext. We would like to show that the ciphertexts are valid ElGamal encryptions to public key $y_i$ of modest size plaintext chunks $s_{i,1},\ldots,s_{i,m}$ so the receiver can extract them and compute her full plaintext $s_i = \sum_{j=1}^{m} s_{i,j} B^{j-1} \mod p$. Each ElGamal ciphertext $(R_j, C_{i,j})$ can be uniquely written as $(g_1^{r_j}, y_i^{r_j} g_1^{s_{i,j}})$, which can be decrypted to get $g_1^{s_{i,j}}$. If the dealer is honest, then $s_{i,j} \in [0..B-1]$ and the receiver can do a brute force search for $s_{i,j}$.

We want to avoid a dishonest dealer using $s_{i,j}$, which cannot be brute force decrypted. We aim for a relaxed range-like proof, which will show there is a small $\Delta_{i,j}$ such that $\Delta_{i,j} s_{i,j}$ belongs to a modest size range. This suffices to show $s_{i,j}$ can be extracted, since the receiver can now do a brute force search for a suitable $\Delta_{i,j}$ that takes us inside the range. Due to the multiplicative factor $\Delta_{i,j}$ and the increase in the range, the brute force search is not as efficient as in an honest dealing, but if there is modest difference between the ranges it is still feasible.

The idea behind the proof of correct chunking is to do many small chunking proofs in parallel. Each of the sub-proofs has modest soundness but jointly they leave the prover with a negligible chance of cheating. Each sub-proof will use a challenge $e_{1,1}, \ldots, e_{n,m} \leftarrow [0..E-1]$. Taking the linear combination $$\prod_{i=1}^{n} \prod_{j=1}^{m} C_{i,j}^{e_{i,j}} = \prod_{i=1}^{n} y_i^{\sum_{j=1}^{m} e_{i,j} r_j} \cdot g_1^{\sum_{i=1}^{n} \sum_{j=1}^{m} e_{i,j} s_{i,j}}$$

we can derive the matching encoded randomness $\prod_{j=1}^{m} R_j^{e_{i,j}} = g_1^{\sum_{j=1}^{m} e_{i,j} r_j}$ for each $y_i$, so we have a uniquely determined $g_1^{\sum_{i=1}^{n} \sum_{j=1}^{m} e_{i,j} s_{i,j}}$. Now, we could (without worrying about zero knowledge for the moment) ask the prover to reveal $z_s = \sum_{i=1}^{n} \sum_{j=1}^{m} e_{i,j} s_{i,j}$. If the prover is honest $s_{i,j} \in [0..B-1]$ and therefore $z_s$ is in the range $[0..S]$, where $S \geq nm(E-1)(B-1)$. Now, what about a dishonest prover providing $z_s \in [0..S]$? Well, if the prover has $\epsilon > \frac{1}{E}$ chance of doing so, then there exists for each $(i,j)$ two sets of challenges $(e_{1,1}, \ldots, e_{i,j}, \ldots, e_{n,m})$ and $(e_{1,1}, \ldots, e'_{i,j}, \ldots, e_{n,m})$ differing only in the $(i,j)$ entry, where the prover reveals $z_s$ and $z'_s$ in the range $[0..S]$. If the prover is revealing the right $z_s, z'_s$ this means $(e_{i,j} - e'_{i,j}) s_{i,j} = \sum_{(i^*,j^*)} e_{i^*,j^*} s_{i^*,j^*} - \sum_{(i^*,j^*)}^{m} e'_{i^*,j^*} s_{i^*,j^*} = z_s - z'_s$, so (when wlog $e_{i,j} \geq e''_{i,j}$) with $\Delta_{i,j} = e_{i,j} - e'_{i,j} \in [1; E-1]$ we have that $\Delta_{i,j} s_{i,j} | \in [-S..S]$. Repeating $\ell$ times, reduces the risk of fraud on entry $(i,j)$ to $\epsilon \leq E^{-\ell}$.

The next question is how to force the prover in each parallel run, numbered $k$, to reveal the correct $z_{s,k} = \sum_{i=1}^{n} \sum_{j=1}^{m} e_{i,j,k} s_{i,j}$. To verify this in a communication-efficient manner, we use a challenge $x$ to batch the $\ell$ parallel runs together to show correctness of the $z_{s,k}$'s in one go.

We also have to avoid revealing the secret values in the witness. So we make the proof zero knowledge by adding blinding factors $\sigma_k$ before revealing $$z_{s,k} = \sum_{i=1}^{n} \sum_{j=1}^{m} e_{i,j,k} s_{i,j} + \sigma_k.$$

Now, if $\sigma_k$ is too large though, we end up with $z_{s,k}$ being too large, which means we can no longer guarantee it is possible to do brute force search in the exponent. On the other hand, if $\sigma_k$ is too small, perhaps it does not hide the sum very well. To get around this problem we use rejection sampling. Consider choosing $\sigma_k$ at random from $[-S; Z-1]$. The resulting $z_{s,k}$ belongs to the range $[-S; Z+S-1]$. We can split this range into two disjoint parts. In the range $[0..Z-1]$ the random choice of $\sigma_k$ makes each $z_{s,k}$ equally likely, and in the other part $[-S; Z+S-1] \setminus [0..Z-1]$ each possible sum $\sum_{i=1}^{n} \sum_{j=1}^{n} e_{i,j} s_{i,j}$ has the same number of possible $z_{s,k}$'s it can hit when $\sigma_k$ is added. So the idea is for the prover to check each $z_{s,k}$ is within the range $[0..Z-1]$, and if not the prover restarts the entire proof with fresh randomness and tries again. Restarting does not leak information, since any sum $\sum_{i=1}^{n}\sum_{j=1}^{m} e_{i,j,k} s_{i,j}$ has equal probability of resulting in a $z_{s,k}$ outside the permitted range, and is invisible in the Fiat-Shamir heuristic since it all happens locally on the prover's side. The risk of landing outside the range in run $k$ is at most $\frac{S}{Z}$, which means over $\ell$ runs it is at most $\frac{\ell S}{Z}$. By choosing the parameter $Z$ carefully, we can ensure the risk of restarting is low enough that the prover on expectation has few restarts, yet also the range $[0..Z-1]$ is small enough that $\Delta_{i,j} s_{i,j} \in [1-Z..Z-1]$ can be found by brute force when given $g_1^{\Delta_{i,j} s_{i,j}}$.

NIZK proof for chunking

Setup: The parameters specify group $\mathbb{G}_1$ of prime order $p$ with generator $g_1$.
The parameters include security parameter $\lambda$ and positive integers $n, m, \ell, B, E, S, Z$ such that $E = 2^{\lceil \lambda/\ell \rceil}$, $S = nm(B-1)(E-1)$ and $2\ell S \leq Z < p2^{-\lambda/\ell}$ ($Z = 2\ell S$, or we can choose larger $Z$ if we want to reduce rejection risk below $1/2$), and $\lambda_e = nm\ell \lceil \lambda/\ell \rceil$.
They also include a hash function $H : \{0,1\}^* \to \mathbb{Z}_p$ and a family of hash functions $H_{\lambda_e} : \{0,1\}^* \to \{0,1\}^{\lambda_e}$.

Instance: Group elements in $\mathbb{G}_1$ $$y_1, \ldots, y_n, R_1 = g_1^{r_1}, \ldots, R_m = g_1^{r_m}, C_{1,1} = y_1^{r_1} g_1^{s_{1,1}}, \ldots, C_{n,m} = y_n^{r_m} g_1^{s_{n,m}}.$$

The discrete logarithms are not part of the instance, but they are uniquely determined by the group elements and indicated for later reference.

Statement: The discrete logarithms of the instance satisfy for all $i = 1, \ldots, n$ and $j = 1, \ldots, m$ that there is $\Delta_{i,j} \in [1; E-1]$ such that $$\Delta_{i,j} s_{i,j} \in [1-Z..Z-1]$$

Witness: Discrete logarithms $r_1, \ldots, r_m, s_{1,1}, \ldots, s_{n,m} \in \mathbb{Z}_p$ satisfying the constraint that all $s_{i,j} \in [0..B-1]$

Prove$^H$(instance, witness):
- Pick $y_0 \xleftarrow{\$} \mathbb{G}_1$, $\sigma_1, \ldots, \sigma_\ell \xleftarrow{\$} [-S; Z-1]$, $\beta_1, \ldots, \beta_\ell \xleftarrow{\$} \mathbb{Z}_p$
- Compute $$B_1 = g_1^{\beta_1} \quad , \quad C_1 = y_0^{\beta_1} g_1^{\sigma_1}, \quad \ldots, \quad B_\ell = g_1^{\beta_\ell} \quad , \quad C_\ell = y_0^{\beta_\ell} g_1^{\sigma_\ell}$$

- Query $H_{\lambda_e}$(instance, $y_0, B_1, C_1, \ldots, B_\ell, C_\ell$), and parse the output as $e_{1,1,1}, \ldots, e_{m,n,\ell} \in [0..E-1]$
- Compute $$z_{s,1} = \sum_{i=1}^{n} \sum_{j=1}^{m} e_{i,j,1} s_{i,j} + \sigma_1, \quad \ldots, \quad z_{s,\ell} = \sum_{i=1}^{n} \sum_{j=1}^{m} e_{i,j,\ell} s_{i,j} + \sigma_\ell$$

and check whether they belong to the range $[0..Z-1]$. If they do not, pick fresh $\sigma_1, \ldots, \sigma_\ell \leftarrow [-S; Z-1]$ and try again for a maximum of $\lambda$ attempts. If $\lambda$ attempts fail, abort by returning $\pi = \bot$.

- Pick $\delta_0, \ldots, \delta_n \xleftarrow{\$} \mathbb{Z}_p$
- Compute $$D_0 = g_1^{\delta_0}, \quad \ldots, \quad D_n = g_1^{\delta_n}, \quad Y = \prod_{i=0}^{n} y_i^{\delta_i}$$

- Query $H(e_{1,1,1}, \ldots, e_{n,m,\ell}, z_{s,1}, \ldots, z_{s,\ell}, D_0, \ldots, D_n, Y)$ to get $x \in \mathbb{Z}_p$
- Compute $$z_{r,1} = \sum_{j=1}^{m} \sum_{k=1}^{\ell} e_{1,j,k} r_j x^k + \delta_1, \quad \ldots, \quad z_{r,n} = \sum_{j=1}^{m} \sum_{k=1}^{\ell} e_{n,j,k} r_j x^k + \delta_n, \quad z_\beta = \sum_{k=1}^{\ell} \beta_k x^k + \delta_0$$

- Let the proof be $\pi = (y_0, B_1, C_1, \ldots, B_\ell, C_\ell, D_0, \ldots, D_n, Y, z_{s,1}, \ldots, z_{s,\ell}, z_{r,1}, \ldots, z_{r,n}, z_\beta)$
- Erase all intermediate information created during the proof and return $\pi$ PVfy$^H$(instance, $\pi$):
- Check that the instance belongs to $\mathbb{G}_1^{n+m+nm}$ and parse $\pi = (y_0, \ldots, z_\beta) \in \mathbb{G}_1^{2\ell+n+2} \times \mathbb{Z}_p^{\ell+n+1}$
- Check $z_{s,1} \ldots, z_{s,\ell} \in [0..Z-1]$
- Compute $e_{1,1,1}, \ldots, e_{n,m,\ell}$ and $x$ by querying $H$ as done by the prover
- Verify $$\prod_{j=1}^{m} R_j^{\sum_{k=1}^{\ell} e_{1,j,k} x^k} \cdot D_1 = g_1^{z_{r,1}}, \quad \ldots, \quad \prod_{j=1}^{m} R_j^{\sum_{k=1}^{\ell} e_{n,j,k} x^k} \cdot D_n = g_1^{z_{r,n}}, \quad \prod_{k=1}^{\ell} B_k^{x^k} \cdot D_0 = g_1^{z_\beta}$$

and $$\prod_{k=1}^{\ell} \left( \prod_{i=1}^{n} \prod_{j=1}^{m} c_{i,j}^{e_{i,j,k}} \right)^{x^k} \cdot \prod_{k=1}^{\ell} C_k^{x^k} \cdot Y = \prod_{i=1}^{n} y_i^{z_{r,i}} \cdot y_0^{z_\beta} \cdot g_1^{\sum_{k=1}^{\ell} z_{s,k} x^k}$$

- If all checks pass accept by returning $\top$, else reject by returning $\bot$

4 Non-interactive distributed key generation and key redistribution with forward secrecy A distributed key generation protocol enables a set of parties to come together to generate a public key together with shares of the secret key. The DKG protocol is run by a set of dealers, and their goal is to generate a public key and provide a set of receivers with matching secret shares of the secret key. The set of participants that act as dealers and the set of participants acting as receivers may identical, overlapping or disjoint.

Using our redistribution protocol on random secret shares chosen by the dealers, we get a DKG protocol that is non-interactive, i.e., the dealers just create and broadcast dealings and do not interact further with the receivers or each other. The receivers and other parties can combine public key material in a set of broadcast dealings to get the public keys for the threshold signature scheme. The receivers also retrieve their secret shares of the signing key from the set of dealings. Beyond looking at broadcast dealings the receivers do not interact with other participants.

When a public key has already been generated, we want to preserve it, but redistribute a new secret sharing of the secret key. In this case, we assume the dealers already have shares of the secret key, but they want to run a distributed resharing protocol to provide a set of receivers with fresh shares of the secret key. According to embodiments both possibilities exist; when the dealer wants to create a fresh dealing they call the dealing algorithm with no input '-' to indicate they do not already have a share, while in redistribution they call the dealing algorithm with their secret key.

Setup: The parameters specify a set of possible indices, which we for simplicity will assume is $[1..N]$ and a maximum number of epochs $T$.

KGen $\to (pk, dk_0)$: Randomized key generation algorithm that returns a public encryption key and a private decryption key initialized for epoch $\tau = 0$.

KVfy$(pk) \to b$: Deterministic key verification algorithm that returns $\top$ if the public key is to be considered valid and $\bot$ otherwise.

KUpd$(dk_\tau) \to dk_{\tau+1}$: Takes as input a decryption key for epoch $\tau$ (the decryption key uniquely determines the relevant epoch) and updates it to a decryption key for epoch $\tau + 1$. In case the decryption key given as input is for $\tau = T - 1$, the update call returns $\bot$ to indicate the epochs have reached the limit.

Deal$(?sk, t, pk_1, \ldots, pk_n, \tau) \to d$: Randomized dealing algorithm that given a threshold and a set of public keys with $n \leq N$ produces a dealing for a given epoch. It takes as optional input a secret key $sk$ to be used in a redistribution dealing and omits any secret key in a fresh dealing.

DVfy$(?shvk, t, pk_1, \ldots, pk_n, \tau, d) \to b$: Deterministic dealing verification algorithm that returns $\top$ if the dealing $d$ is to be considered valid and $\bot$ otherwise. It takes as optional input a share verification key $shvk$. The intention is that $shvk$ can be included to test a redistribution dealing, while it is not included when testing a fresh dealing.

It is natural to sanity check inputs, so we assume the dealing verification algorithm can only return $\top$ on positive integers $t \leq n \leq N$ and $\tau \in [0..T-1]$. We also require the consistency property that inclusion of an optional share verification key makes dealing verification as strict or stricter than dealing verification without a share verification key.

VKCombine$(t, n, I, d_1, \ldots, d_\ell) \to (vk, shvk_1, \ldots, shvk_n)$: Deterministic algorithm that given a set $I$ of distinct indices $i_1 < \ldots < i_\ell$ and corresponding dealings returns a public verification key $vk$ and share-verification keys $shvk_1, \ldots, shvk_n$.

VKVfy$(t, vk, shvk_1, \ldots, shvk_n) \to b$: Deterministic algorithm that given a threshold $t$ and a set of verification keys returns $\top$ if the keys are to be considered valid, and otherwise returns $\bot$. The algorithm can only return $\top$ on positive integers $t \leq n \leq N$.

SKRetrieve($j, dk_{\tau'}, I, d_1, \ldots, d_\ell, \tau$) → $sk$: Deterministic algorithm that given a decryption key, an index set $I$ of size $\ell$, and matching dealings $d_1, \ldots, d_\ell$ for an epoch $\tau$ returns a secret share-signing key $sk$ for a given index $j$.

SKVfy($sk, shvk$) → $b$: Deterministic secret key verification algorithm that given a secret share-signing key returns ⊤ if it is to be considered valid with respect to a share-verification key $shvk$, and otherwise ⊥.

Correctness. The protocol we construct will have the following correctness properties:

— Key generation produces valid public keys $$\Pr[(pk, dk_0) \leftarrow \mathsf{KGen} : \mathsf{KVfy}(pk) = \top] = 1$$

— Dealings made over valid public keys are valid. More precisely, if $1 \le t \le n \le N$ and $\tau \in [0..T-1]$ and $pk_1, \ldots, pk_n$ are valid public keys so that $\mathsf{KVfy}(pk_i) = \top$ and $\mathsf{SKVfy}(sk, shvk) = \top$ or alternatively $(sk, shvk) = (-, -)$ then $$\Pr[d \leftarrow \mathsf{Deal}(?sk, t, pk_1, \ldots, pk_n, \tau) : \mathsf{DVfy}(?shvk, t, pk_1, \ldots, pk_n, \tau, d) = \top] \approx 1.$$

— Dealing verification is consistent. If $\mathsf{DVfy}(shvk, t, pk_1, \ldots, pk_n, d) = \top$ then $\mathsf{DVfy}(-, t, pk_1, \ldots, pk_n, \tau, d) = \top$.

— Valid dealings result in valid verification keys. If $t, pk_1, \ldots, pk_n, \tau$ and dealings $d_1, \ldots, d_\ell$ all satisfy $\mathsf{DVfy}(-, t, pk_1, \ldots, pk_n, \tau, d_k) = \top$ and index set $I \subseteq [1..N]$ has size $\ell$, then $$\Pr\left[\begin{array}{c}(vk, shvk_1, \ldots, shvk_n) \leftarrow \mathsf{VKCombine}(t, n, I, d_1, \ldots, d_\ell): \\ \mathsf{VKVfy}(t, vk, shvk_1, \ldots, shvk_{n'}) = \top\end{array}\right] = 1.$$

— An honest receiver should be able to retrieve a valid secret key for herself from a set of valid dealings. We define a retrieval adversary $\mathcal{A}$'s advantage to be $$\Pr\left[\begin{array}{c}(pk, dk_0) \leftarrow \mathsf{KGen}; (j, I, pk_1, \ldots, pk_n, d_1, \ldots, d_\ell, \tau) \leftarrow \mathcal{A}^{\mathsf{KUpd}}(pk, dk_0) \\ (vk, shvk_1, \ldots, shvk_n) \leftarrow \mathsf{VKCombine}(t, n, I, d_1, \ldots, d_\ell) \\ sk \leftarrow \mathsf{SKRetrieve}(j, dk_{\tau'}, I, d_1, \ldots, d_\ell, \tau): \\ I \subset [1..n] \text{ and } |I| = \ell \text{ and } pk_j = pk \text{ and all dealings are valid, i.e.,} \\ \mathsf{DVfy}(-, t, pk_1, \ldots, pk_n, \tau, d_i) = \top \text{ and } \tau' \le \tau, \text{ yet } \mathsf{SKVfy}(sk, shvk_j) \ne \top\end{array}\right],$$

where on each call to KUpd the oracle sets $dk_{\tau'+1} := \mathsf{KUpd}(dk_{\tau'})$ and $\tau' := \tau'+1$, and stops reacting to further calls once $\tau'+1 = T$. The oracle responds to the call by sending the decryption key to the adversary.[5]

---

[5] We assume all dealings operate with respect to the same target epoch. This can be relaxed, it is conceivable the dealings are for different epochs, but the definitions have to be tweaked a bit in that case.

Verification-key preservation. The protocol preserves the verification key if for positive integers $t \leq n \leq N, t' \leq n' \leq N$, verification keys $vk, shvk_1, \ldots, shvk_n$ with $\mathsf{VKVfy}(t, vk, shvk_1, \ldots, shvk_n) = \top$, index set $I$ containing $i_1 < \ldots, i_t \leq n$, epoch $\tau \in [0..T-1]$, public keys $pk_1, \ldots, pk_{n'}$ and valid dealings $d_1, \ldots, d_t$ with $\mathsf{DVfy}(shvk_{i_k}, t', pk_1, \ldots, pk_{n'}, \tau, d_k) = \top$, we have $$\Pr[(vk', shvk'_1, \ldots, shvk'_{n'}) \leftarrow \mathsf{VKCombine}(t', n', I, d_1, \ldots, d_t) : vk' = vk] = 1.$$

4.1 Construction.

According to embodiments, we have a non-interactive key redistribution protocol with forward secrecy. The protocol builds on the CCA-secure multi-receiver encryption scheme with forward secrecy we described earlier, from which we get the key generation, key verification and key update algorithms KGen, KVfy and KUpd. In embodiments, the invention is used for BLS threshold signatures, which use the VKVfy, SKVfy algorithms to verify the generated keys. We present the full protocol in a self-contained manner here including those algorithms.

Setup: The setup includes groups $\mathbb{G}_1, \mathbb{G}_2, \mathbb{G}_T$ of known prime order $p$ with a pairing $e : \mathbb{G}_1 \times \mathbb{G}_2 \to \mathbb{G}_T$ and generators $g_1, g_2, e(g_1, g_2)$. The BLS threshold signature scheme uses a hash function $H_{\mathbb{G}_1} : \{0,1\}^* \to \mathbb{G}_1$.

The parameters define a maximal number of epochs $T = 2^{\lambda_T}$ and a bound $N < p$ defining the set of indices $[1..N]$ the protocol may assign to participants, which means $N$ is the maximal set of receivers we can have in a single dealing.

The setup also specifies group elements $f_0, \ldots, f_\lambda, h \in \mathbb{G}_2$, which are used in our CCA-secure encryption scheme with forward secrecy. Implicitly the group elements define a function $f : \mathbb{Z}_p^\lambda \to \mathbb{G}_2$ given by $f(\tau_1, \ldots, \tau_\lambda) := f_0 \cdot \prod_{i=1}^\lambda f_i^{\tau_i}$ that we will make frequent use of.[6] As part of the parameters for the encryption scheme there is a chunk size $B \geq 2$. We let $m := \lceil \log_B(p) \rceil$, which implies $B^m \geq p$. The encryption scheme makes use of a hash function $H_{\lambda_H} : \{0,1\}^* \to \{0,1\}^{\lambda_H}$ and the parameter $\lambda$ should satisfy $\lambda = \lambda_T + \lambda_H$. The encryption scheme also uses a simulation-extractable NIZK proof of knowledge of a discrete logarithm of an element in $\mathbb{G}_1$.

The construction makes use of the simulation-sound NIZK proofs for correct secret sharing and correct chunking that we presented in Section 3. The NIZK proofs rely on a hash function $H_{\mathbb{Z}_p} : \{0,1\}^* \to \mathbb{Z}_p$. The NIZK proof for chunking includes functions to compute additional parameters $\ell, E, S, Z, \lambda_e$. The NIZK proof for chunking also uses a family of hash functions $H_{\lambda_e} : \{0,1\}^* \to \{0,1\}^{\lambda_e}$, where the length of the output $\lambda_e$ may be chosen by the user.

---

[6] The group elements $f_0, \ldots, f_\lambda, h$ may be generated with a hash function $H_{\text{setup}} : \{0,1\}^* \to \mathbb{G}_2^{\lambda+2}$ to convince third parties that we have nothing up our sleeve. In the random oracle model, this gives us a set of random group elements (up to grinding).

KGen → $(pk, dk_0)$: Pick $x \xleftarrow{\$} \mathbb{Z}_p$ and set $$y := g_1^x.$$

Construct a proof of knowledge of the discrete logarithm $\pi_{\mathsf{dlog}} \leftarrow \mathsf{Prove}_{\mathsf{dlog}}(y; x)$.
Set $pk := (y, \pi_{\mathsf{dlog}})$.
Pick $\rho \xleftarrow{\$} \mathbb{Z}_p$. Set $$dk := (g_1^\rho, g_2^x f_0^\rho, f_1^\rho, \ldots, f_\lambda^\rho, h^\rho) \in \mathbb{G}_1 \times \mathbb{G}_2^{\lambda+2}$$

and $dk_0 := (0, dk)$.
Erase intermediate information and return $(pk, dk_0)$.

KVfy$(pk) \to b$: Parse $pk = (y, \pi_{\mathsf{dlog}})$ and if $y \in \mathbb{G}_1$ return $\mathsf{PVfy}_{\mathsf{dlog}}(y, \pi_{\mathsf{dlog}}) = \top$, else return $\bot$.

KUpd$(dk_\tau, k) \to dk_{\tau+k}$: Before describing the update procedure, let us give the high level structure of a decryption key $dk_\tau$.

The forward secure encryption scheme builds on a tree encryption scheme, for a binary tree of size $2^\lambda$. Messages are encrypted to leaves of the tree and it should be the case that a decryption key for an internal node allows you to derive decryption keys for all nodes in the subtree below that node. The structure of a decryption key for a public key with $y = g_1^x$ and a node $\tau_1 \ldots \tau_\ell$ at height $\ell \leq \lambda$ in the binary tree is $$dk_{\tau_1 \ldots \tau_\ell} = (\tau_1 \ldots \tau_\ell, a, b, d_{\ell+1}, \ldots, d_\lambda, e)$$
$$= \left(\tau_1 \ldots \tau_\ell, g_1^\rho, g_2^x \left(f_0 \prod_{i=1}^\ell f_i^{\tau_i}\right)^\rho, f_{\ell+1}^\rho, \ldots, f_\lambda^\rho, h^\rho\right) \in \{0,1\}^\ell \times \mathbb{G}_1 \times \mathbb{G}_2^{\lambda-\ell+2}.$$

If the decryption key has been generated with the algorithms from the protocol, $\rho$ will have been chosen uniformly at random from $\mathbb{Z}_p$.[7]

From a decryption key $dk_{\tau_1 \ldots \tau_\ell}$ it is possible to derive a perfectly randomized decryption key $dk_{\tau_1 \ldots \tau_{\ell+k}}$ for any node in the subtree by picking $\delta \xleftarrow{\$} \mathbb{Z}_p$ and setting $$dk_{\tau_1 \ldots \tau_{\ell+k}} := \left(\tau_1 \ldots \tau_{\ell+k}, a \cdot g_1^\delta, b \cdot \prod_{i=\ell+1}^{\ell+k} d_i^{\tau_i} \cdot (f_0 \prod_{i=1}^{\ell+k} f_i^{\tau_i})^\delta, d_{\ell+k+1} \cdot f_{\ell+k+1}^\delta, \ldots, d_\lambda \cdot f_\lambda^\delta, e \cdot h^\delta\right).$$

The new decryption key has randomness $\rho + \delta$, which is uniformly random in $\mathbb{Z}_p$.

In the encryption scheme with forward secrecy the prefix $\tau_1 \ldots \tau_{\lambda_T}$ will indicate the epoch the decryption key works for. The decryption key $dk_\tau$ with $\tau \in [0..T-1]$ must therefore allow us to derive the key $dk_{\tau_1 \ldots \tau_{\lambda_T}}$ and also enable us to derive keys for all subsequent leaves in the height $\lambda_T$ subtree. For any $\tau \in [0..T-1]$ let $\mathcal{T}_\tau$ be the minimal set of nodes $\tau_1 \ldots \tau_\ell$ (with $\ell \leq \lambda_T$)

---

[7] In the key generation algorithm, $dk$ is a decryption key for the root of the binary tree of this form.

such that their subtrees are disjoint and cover all the leaves in $[\tau..T-1]$. A decryption key $dk_\tau$ is of the form $$dk_\tau := \left(\tau, \{dk_{\tau_1\ldots\tau_\ell}\}_{\tau_1\ldots\tau_\ell \in \mathcal{T}_\tau}\right).^8$$

The key update algorithm works is given $dk_\tau$ and $k$ such that $\tau + k < T$. From the set of tree decryption keys $\{dk_{\tau_1\ldots\tau_\ell}\}_{\tau_\ell}\}_{\tau_1\ldots\tau_\ell \in \mathcal{T}_\tau}$ it uses the relevant keys in the subtree to derive randomized decryption keys $dk_{\tau_1\ldots\tau_\ell}$ for all $\tau_1\ldots\tau_\ell \in \mathcal{T}_{\tau+k} \setminus \mathcal{T}_\tau$. It then erases intermediate data and returns $$dk_{\tau+k} = \left(\tau+k, \{dk_{\tau_1\ldots\tau_\ell}\}_{\tau_1\ldots\tau_\ell \in \mathcal{T}_{\tau+k}}\right).$$

In case a decryption key is malformed or $k \notin [1..T - \tau - 1]$ the update algorithm returns $\bot$.[9]

Deal($?sk, t, pk_1, \ldots, pk_n, \tau$) $\to d$:

Parse the input as $?sk = -$ or $sk \in \mathbb{Z}_p$, $t \in [1..n]$ with $n \leq N$, $pk_i = (y_i, \pi_i)$ with $y_i \in \mathbb{G}_1$, $\tau \in [0..T-1]$ and if it fails return $\bot$.[10]

- If $sk$ is not present, pick at random $sk \xleftarrow{\$} \mathbb{Z}_p$
- Parse $\tau = \tau_1 \ldots \tau_{\lambda_T}$ in binary.
- Set $a_0 := sk$ and pick random $a_1, \ldots, a_{t-1} \xleftarrow{\$} \mathbb{Z}_p$
- Compute $s_1, \ldots, s_n$ as $s_i = \sum_{k=0}^{t-1} a_k i^k \bmod p$
- Write each $s_i$ in $B$-ary notation, i.e., $s_i = \sum_{j=1}^{m} s_{i,j} B^{j-1}$ with $s_{i,j} \in [0..B-1]$
- Pick randomness $r_1, s_1, \ldots, r_m, s_m \xleftarrow{\$} \mathbb{Z}_p$
- Compute $C_{1,1}, \ldots, C_{n,m}, R_1, S_1, \ldots, R_m, S_m$ as $$C_{i,j} := y_i^{r_j} \cdot g_1^{s_{i,j}} \qquad R_j := g_1^{r_j} \qquad S_j := g_1^{s_j}$$

- Compute $\tau_{\lambda_T+1}\ldots\tau_{\lambda_H} := H_{\lambda_H}(C_{1,1},\ldots,C_{n,m},R_1,S_1,\ldots,R_m,S_m,\tau)$
- Compute $f := f(\tau_1\ldots\tau_\lambda)$
- Compute $Z_1, \ldots, Z_m$ as $Z_j := f^{r_j} h^{s_j}$
- Compute $A_0 := g_2^{a_0}, \ldots, A_{t-1} := g_2^{a_{t-1}}$
- Compute $r := \sum_{j=1}^{m} r_j B^{j-1} \bmod p$
- Compute $R := g_1^r$ and $C_1 := y_1^r \cdot g_1^{s_1}, \ldots, C_n := y_n^r \cdot g_1^{s_n}$
- Construct a correct secret sharing proof $$\pi_{\text{share}} \leftarrow \text{Prove}_{\text{share}}(y_1, \ldots, y_n, A_0, \ldots, A_{t-1}, R, C_1, \ldots, C_n; r, s_1, \ldots, s_n)$$

- Construct a correct chunking proof $$\pi_{\text{chunk}} \leftarrow \text{Prove}_{\text{chunk}}(y_1, \ldots, y_n, R_1, \ldots, R_m, C_{1,1}, \ldots, C_{n,m}; r_1, \ldots, r_m, s_{1,1}, \ldots, s_{n,m})$$

---

[8] In the key generation algorithm, it can be seen that $dk_0$ has this form.

[9] Because decryption keys are perfectly randomized running $dk_{\tau+k} \leftarrow \text{KUpd}(dk_\tau, k)$ is equivalent to $dk_{\tau+1} \leftarrow \text{KUpd}(dk_\tau, 1), \ldots, dk_{\tau+k} \leftarrow \text{KUpd}(dk_{\tau+k-1}, 1)$ so in the security definitions we just use one-step updates and omit the jump $k$ by defining $\text{KUpd}(dk_\tau) = \text{KUpd}(dk_\tau, 1)$.

[10] The dealing algorithm does not explicitly check the proofs $\pi_i$ of knowledge of discrete logarithms of $y_i$ assuming such a check has already been performed elsewhere.

- Erase intermediate information and return the dealing $$d := \begin{pmatrix} C_{1,1}, \ldots, C_{n,m}, R_1, S_1, \ldots, R_m, S_m \\ Z_1, \ldots, Z_m, A_0, \ldots, A_{t-1}, \pi_{\text{share}}, \pi_{\text{chunk}} \end{pmatrix}$$

DVfy($?shvk, t, pk_1, \ldots, pk_n, \tau, d$):
  Parse the input as $?shvk = -$ or $?shvk \in \mathbb{G}_2$, $t \in [1..n]$ with $n \leq N$, $pk_i = (y_i, \pi_i)$ with $y_i \in \mathbb{G}_1$, $\tau \in [0..T-1]$ and if the parsing fails return $\bot$.[11]
  - Check the dealing is of the form $$d := \begin{pmatrix} C_{1,1}, \ldots, C_{n,m}, R_1, S_1, \ldots, R_m, S_m \\ Z_1, \ldots, Z_m, A_0, \ldots, A_{t-1}, \pi_{\text{share}}, \pi_{\text{chunk}} \end{pmatrix}$$

with $C_{i,j}, R_j, S_j \in \mathbb{G}_1$ and $Z_j, A_k \in \mathbb{G}_2$
  - If the optional $shvk$ is present, check $shvk = A_0$
  - Set $\tau_{\lambda_T+1} \ldots \tau_\lambda := H_{\lambda_H}(C_{1,1}, \ldots, C_{n,m}, R_1, S_1, \ldots, R_m, S_m, \tau)$
  - Set $f := f(\tau_1, \ldots, \tau_\lambda)$
  - Verify for each triple $(R_1, S_1, Z_1), \ldots, (R_m, S_m, Z_m)$ that $e(g_1, Z_j) = e(R_j, f) \cdot e(S_j, h)$
  - Verify the proof for correct secret sharing by checking $$\mathsf{PVfy}_{\text{share}}(y_1, \ldots, y_n, A_0, \ldots, A_{t-1}, \prod_{j=1}^m R_j^{B^{j-1}}, \prod_{j=1}^m C_{1,j}^{B^{j-1}}, \ldots, \prod_{j=1}^m C_{n,j}^{B^{j-1}}; \pi_{\text{share}}) = \top$$

- Verify the proof for chunking by checking $$\mathsf{PVfy}_{\text{chunk}}(y_1, \ldots, y_n, R_1, \ldots, R_m, C_{1,1}, \ldots, C_{n,m}; \pi_{\text{chunk}}) = \top$$

- Return $\top$ if all checks pass, else return $\bot$

VKCombine($t, n, I, d_1, \ldots, d_\ell$): Given $1 \leq t \leq n \leq N$, and a set $I$ of $\ell$ indices $1 \leq i_1 < \ldots < i_\ell \leq n$ and a set of dealings $$d_j := (\ldots, A_{j,0}, \ldots, A_{j,t-1}, \ldots)$$

with all $A_{j,k} \in \mathbb{G}_2$ compute $A_0, \ldots, A_{t-1}$ as $$A_k := \prod_{j=1}^\ell A_{i_j,k}^{L_{i_j}^I(0)}$$

- Set $vk := A_0$
  - Compute $shvk_1, \ldots, shvk_n$ as $$shvk_j := \prod_{k=0}^{t-1} A_k^{j^k}$$

---
[11] The dealing verification algorithm assumes the proofs $pi_i$ of knowledge of the discrete logarithms of $y_i$ have already been done elsewhere.

- If all works return $(vk, shvk_1, \ldots, shvk_n)$, else return $\perp$.

VKVfy$(t, vk, shvk_1, \ldots, shvk_n)$: We recap the validity condition for public key material in the BLS threshold signature scheme. Check $1 \leq t \leq n \leq N$ and $vk, shvk_1, \ldots, shvk_n \in \mathbb{G}_2$. Set $shvk_0 := vk$ and $J = \{0, \ldots, t-1\}$. For $i = t, \ldots, n$ check whether $$shvk_i = \prod_{j \in J} shvk_j^{L_j^J(i)}.$$

Return $\top$ if all checks pass, else return $\perp$

SKRetrieve$(i, dk_{\tau'}, K, d_1, \ldots, d_\ell, \tau)$: Parse each dealing as $$d_k = (C_{k,1,1}, \ldots, C_{k,n,m}, \ldots, C_{k,i,1}, R_{k,1}, S_{k,1}, \ldots, R_{k,m}, S_{k,m}, Z_{k,1}, \ldots, Z_{k,m}, \ldots),$$

with $C_{k,i,j}, R_{k,j}, S_{k,j} \in \mathbb{G}_1$ and $Z_{k,j} \in \mathbb{G}_2$. Check $1 \leq i \leq n \leq N$.

For $k = 1, \ldots, \ell$ define $\tau_{k,1} = \tau_1, \ldots, \tau_{k,\lambda_T} = \tau_{\lambda_T}$ and compute $$\tau_{k,\lambda_T+1} \ldots \tau_{k,\lambda} := H_{\lambda_H}(C_{k,1,1}, \ldots, C_{k,n,m}, R_{k,1}, S_{k,1}, \ldots, R_{k,m}, S_{k,m}, \tau).$$

Let $f_k := f(\tau_{k,1}, \ldots, \tau_{k,\lambda})$.

Assuming $\tau' \leq \tau$ derive as described in decryption key update from $dk_{\tau'}$ a BTE decryption key $$dk_{\tau_{k,1}, \ldots, \tau_{k,\lambda}} = (\tau_{k,1} \ldots \tau_{k,\lambda}, a_k, b_k, e_k) \in \{0,1\}^\lambda \times \mathbb{G}_1 \times \mathbb{G}_2^2$$

for $k = 1, \ldots, \ell$.

For each $k = 1, \ldots, \ell$ and $j = 1, \ldots, m$ compute $$M_{k,j} := e(C_{k,i,j}, g_2) \cdot e(R_{k,j}, b_k^{-1}) \cdot e(a_k, f_k) \cdot e(S_{k,j}, h^{-1}).$$

Then do a brute force search with the Baby-Step Giant-Step algorithm for $s_{k,j} \in \{z/\Delta | \Delta \in [1..E-1], z \in [1-Z; Z-1]\}$ such that $M_{k,j} = e(g_1, g_2)^{s_{k,j}}$. Compute $$s_k := \sum_{j=1}^{m} s_{k,j} B^{j-1} \bmod p.$$

Parse $K \subset [1..n]$ as distinct indices $k_1 < \ldots < k_\ell$ and compute $$s_i := \sum_{j=1}^{\ell} s_{k,j} L_{k_j}^K(0).$$

Erase intermediate data and if everything went well return $sk := s_i$ and otherwise return $\perp$.

SKVfy$(sk, shvk)$: We recap the validity condition for secret share-signing keys in the BLS threshold signature scheme. If $sk \in \mathbb{Z}_p$ and $shvk = g_2^{sk}$ erase intermediate data and return $\top$, else return $\perp$.

According to embodiments we have the following correspondence in the Deal algorithm

- $sk$ is the dealer's secret share and $a_0, \ldots, a_{t-1}$ the coefficients of a polynomial defining a Shamir secret sharing
- $s_1, \ldots, s_n$ are sub-shares created by the dealer to share the dealer's secret share $sk$
- $A_0$ is existing associated key material related to the dealer's secret share by $A_0 = g_2^{sk}$
- $A_1, \ldots, A_{t-1}$ is associated public key material generated by the dealer
- $s_{1,1}, \ldots, s_{n,m}$ are chunks of the sub-shares used in the encryption scheme
- $\{C_{1,1}, \ldots, C_{n,m}, R_1, S_1, \ldots, R_m, S_m, Z_1, \ldots, Z_m\}$ constitute a ciphertext in a CCA-secure multi-receiver public-key encryption scheme with forward secrecy giving a chunked encryption of the dealer's secret sharing
- $\pi_{share}$ is a first NIZK proof provided by the dealer to show the encrypted secret sharing and associated public key material $A_0, \ldots, A_{t-1}$ is correct
- $\pi_{chunk}$ is a second NIZK proof provided by the dealer to show the plaintexts have been correctly chunked According to embodiments we have the following relations in associate key material in the VKCombine algorithm

- The input $A_{j,0}, \ldots, A_{j,t-1}$ is associated key material in dealing $d_j$
- The output $vk$ is associated key material: the group element is the verification key of the BLS signature scheme
- The outputs $shvk_1, \ldots, shvk_n$ is associated key material: the group elements are share-verification keys in the BLS signature scheme

The invention claimed is:

1. A computer-implemented method for redistribution of a (n,t)-secret sharing of a secret from a set of dealers to a set of receivers, the (n,t)-secret sharing comprising n secret shares, wherein a threshold number t≤n of the secret shares is sufficient to reconstruct the secret, the method comprising:
    performing, by each of at least the threshold number t of dealers, the steps of:
        creating a (n',t')-secret sharing of its respective secret share, the (n',t')-secret sharing comprising n'secret sub-shares of its respective secret share, wherein a threshold number t'≤n' of the secret sub-shares is sufficient to reconstruct the secret share;
        creating a set of ciphertexts, the set of ciphertexts comprising for each receiver of the set of receivers one encrypted sub-share of the n'secret sub-shares of its respective secret share, the encrypted secret sub-share being encrypted with respect to a public encryption key of a public-key encryption scheme of the respective receiver;
        generating a non-interactive zero-knowledge proof that the set of ciphertexts jointly contain a redistribution of its secret share;
        broadcasting a dealing to the set of receivers, the dealing comprising the set of ciphertexts for the set of receivers and the corresponding non-interactive zero-knowledge proof;
        using a public-key encryption scheme with forward secrecy for encrypting the secret sub-shares for the receivers,
            wherein the encryption scheme is configured to perform a chunked encryption of the sub-shares, wherein each sub-share is split into a plurality of plaintexts each representing a chunk; and
        generating, by the set of dealers, a further non-interactive zero-knowledge proof, the further zero-knowledge proof being configured to prove that the chunked encryption is correct.

2. The computer-implemented method according to claim 1, further comprising:
    checking, by a predefined set of parties, the non-interactive zero-knowledge proofs of the dealings; and
    once a sufficient number t of proofs have been successfully checked,
    decrypting, by each of the receivers, its encrypted sub-shares across the dealings; and
    combining, by each of the receivers, the decrypted sub-shares to a new secret share of the secret.

3. The computer-implemented method according to claim 2, further comprising:
    creating, by any party, from the associated public key material created by the set of dealers new associated public key material associated to the new secret sharing and the new secret shares of the set of receivers.

4. The computer-implemented method according to claim 2, further comprising performing the decrypting of the encrypted sub-shares in a separate process, on a virtual hardware security module, or on a hardware security module.

5. The computer-implemented method according to claim 1, wherein the zero-knowledge proofs are publicly verifiable zero-knowledge proofs such that any party can verify them.

6. The computer-implemented method according to claim 1, wherein the secret sharing is a linear secret sharing.

7. The computer-implemented method according to claim 1, further comprising:
    creating, by each dealer, associated public key material associated to its secret share and its secret sharing of said secret share; and
    adding the associated public key material to the dealing.

8. The computer-implemented method according to claim 7, wherein the associated public key material comprises:
    a public group element related to the secret share of each dealer; and/or
    public group elements which are related to the secret sharing created by each dealer.

9. The computer-implemented method according to claim 7, wherein the creating of the new associated public key material comprises:
    deriving the new associated public key material from the associated public key material created by the set of dealers, the new associated public key material comprising
    public share verification keys which are associated to the new secret shares of the receivers;
    a public verification key related to the secret key; and/or
    elements from which the public share verification keys of the receivers and/or the public verification key may be derived.

10. The computer-implemented method according to claim 1, wherein the secret is a secret key corresponding to a public verification key of a public key signature scheme.

11. The computer-implemented method according to claim 1, wherein the public-key encryption scheme uses chosen ciphertext attack security for the encrypting the secret sub-shares for the set of receivers.

12. The computer-implemented method according to claim 1,
    wherein the encryption scheme with forward secrecy is a binary tree encryption scheme.

13. The computer-implemented method according to claim 1,
    wherein the public-key encryption scheme is a multi-receiver encryption scheme, the multi-receiver encryption scheme being configured to encrypt the sub-shares of a dealer to the public encryption keys of the set of receivers.

14. The computer-implemented method according to claim 13,
    wherein the multi-receiver encryption scheme uses shared randomness to encrypt the sub-shares of the set of dealers to the public encryption keys of the set of receivers.

15. A distributed network comprising a plurality of nodes, wherein the network is configured to perform a computer-implemented method for redistribution of a (n,t)-secret sharing of a secret from a set of dealers to a set of receivers, the (n,t)-secret sharing comprising n secret shares, wherein a threshold number t≤n of the secret shares is sufficient to reconstruct the secret s, the method comprising:
    performing, by each of at least the threshold number t of dealers, the steps of:
        creating a (n',t')-secret sharing of its respective secret share, the (n',t')-secret sharing comprising n'secret sub-shares of its respective secret share, wherein a threshold number t'≤n' of the secret sub-shares is sufficient to reconstruct the secret share;
        creating a set of ciphertexts, the set of ciphertexts comprising for each receiver of the set of receivers one encrypted sub-share of the n'secret sub-shares of its respective secret share, the encrypted secret sub-share being encrypted with respect to a public encryption key of a public-key encryption scheme of the respective receiver;

generating a non-interactive zero-knowledge proof that the set of ciphertexts jointly contain a redistribution of its secret share; and broadcasting a dealing to the set of receivers, the dealing comprising the set of ciphertexts for the set of receivers and the corresponding non-interactive zero-knowledge proof;

using a public-key encryption scheme with forward secrecy for encrypting the secret sub-shares for the receivers, wherein the encryption scheme is configured to perform a chunked encryption of the sub-shares, wherein each sub-share is split into a plurality of plaintexts each representing a chunk; and generating, by the set of dealers, a further non-interactive zero-knowledge proof, the further zero-knowledge proof being configured to prove that the chunked encryption is correct.

16. A node for a distributed network, the node comprising: a hardware processor; and a memory, wherein the network comprises a plurality of nodes including the node, and the network is configured to perform a computer-implemented method for redistribution of a (n,t)-secret sharing of a secret from a set of dealers to a set of receivers, the (n,t)-secret sharing comprising n secret shares, wherein a threshold number $t \leq n$ of the secret shares is sufficient to reconstruct the secret s, the method comprising:

performing, by each of at least the threshold number t of dealers, the steps of:

creating a (n',t')-secret sharing of its respective secret share, the (n',t')-secret sharing comprising n' secret sub-shares of its respective secret share, wherein a threshold number $t' \leq n'$ of the secret sub-shares is sufficient to reconstruct the secret share;

creating a set of ciphertexts, the set of ciphertexts comprising for each receiver of the set of receivers one encrypted sub-share of the n'secret sub-shares of its respective secret share, the encrypted secret sub-share being encrypted with respect to a public encryption key of a public-key encryption scheme of the respective receiver;

generating a non-interactive zero-knowledge proof that the set of ciphertexts jointly contain a redistribution of its secret share; and broadcasting a dealing to the set of receivers, the dealing comprising the set of ciphertexts for the set of receivers and the corresponding non-interactive zero-knowledge proof;

using a public-key encryption scheme with forward secrecy for encrypting the secret sub-shares for the receivers, wherein the encryption scheme is configured to perform a chunked encryption of the sub-shares, wherein each sub-share is split into a plurality of plaintexts each representing a chunk; and generating, by the set of dealers, a further non-interactive zero-knowledge proof, the further zero-knowledge proof being configured to prove that the chunked encryption is correct.

17. A non-transitory computer readable medium storing a computer program product for redistribution of a (n,t)-secret sharing of a secret from a set of dealers to a set of receivers, the (n,t)-secret sharing comprising n secret shares, wherein a threshold number $t \leq n$ of the secret shares is sufficient to reconstruct the secret, the computer program product comprising program instructions executable by one or more nodes of a distributed network to cause the one or more nodes to perform a method comprising:

performing, by each of at least the threshold number t of dealers, the steps of:

creating a (n',t')-secret sharing of its respective secret share, the (n',t')-secret sharing comprising n'secret sub-shares of its respective secret share, wherein a threshold number $t' \leq n'$ of the secret sub-shares is sufficient to reconstruct the secret share;

creating a set of ciphertexts, the set of ciphertexts comprising for each receiver of the set of receivers one encrypted sub-share of the n'secret sub-shares of its respective secret share, the encrypted secret sub-share being encrypted with respect to a public encryption key of a public-key encryption scheme of the respective receiver;

generating a non-interactive zero-knowledge proof that the set of ciphertexts jointly contain a redistribution of its secret share;

broadcasting a dealing to the set of receivers, the dealing comprising the set of ciphertexts for the set of receivers and the corresponding non-interactive zero-knowledge proof;

using a public-key encryption scheme with forward secrecy for encrypting the secret sub-shares for the receivers, wherein the encryption scheme is configured to perform a chunked encryption of the sub-shares, wherein each sub-share is split into a plurality of plaintexts each representing a chunk; and generating, by the set of dealers, a further non-interactive zero-knowledge proof, the further zero-knowledge proof being configured to prove that the chunked encryption is correct.

\* \* \* \* \*